United States Patent
Tohda et al.

(10) Patent No.: US 6,764,124 B2
(45) Date of Patent: Jul. 20, 2004

(54) BODY STRUCTURE FOR CONVERTIBLE CAR

(75) Inventors: Isao Tohda, Hiroshima (JP); Haruo Ohe, Hiroshima (JP); Naohiro Imaoka, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/195,307

(22) Filed: Jul. 16, 2002

(65) Prior Publication Data

US 2003/0030297 A1 Feb. 13, 2003

(30) Foreign Application Priority Data

Jul. 18, 2001 (JP) ........................................ 2001-217590
Jul. 18, 2001 (JP) ........................................ 2001-217591
Jul. 19, 2001 (JP) ........................................ 2001-218907

(51) Int. Cl.[7] ............................. B60J 1/02; B60R 21/13
(52) U.S. Cl. ............................. 296/96.12; 296/187.03; 296/187.12; 296/203.03; 296/193.6; 296/146.9; 280/756
(58) Field of Search ........................ 296/187.03, 187.09, 296/187.12, 201, 96.1, 203.02, 203.03, 193.06, 146.8, 146.9, 96.12, 146.6, 109, 188, 189, 185, 186, 194; 280/756

(56) References Cited

U.S. PATENT DOCUMENTS

| | | | | |
|---|---|---|---|---|
| 2,620,221 A | * | 12/1952 | Ramano | 296/155 |
| 3,027,186 A | * | 3/1962 | Chapipar | 296/201 |
| 4,557,502 A | * | 12/1985 | Scaduto et al. | 296/109 |
| 4,651,470 A | * | 3/1987 | Imura et al. | 296/146.6 |
| 4,676,524 A | * | 6/1987 | Ball et al. | 280/756 |
| 4,807,925 A | * | 2/1989 | Sakamoto et al. | 296/194 |
| 4,900,082 A | * | 2/1990 | Schwuchow et al. | 296/194 |
| 5,009,463 A | * | 4/1991 | Saitoh et al. | 296/210 |
| 5,584,522 A | | 12/1996 | Kerner et al. | |
| 5,941,597 A | | 8/1999 | Horiuchi et al. | |
| 6,302,474 B1 | * | 10/2001 | Drysdale et al. | 296/146.6 |
| 6,332,641 B1 | * | 12/2001 | Okana | 296/146.6 |
| 6,334,366 B1 | * | 1/2002 | Schuler et al. | 280/756 |
| 6,378,933 B1 | * | 4/2002 | Schoen et al. | 296/188 |
| 6,382,660 B1 | * | 5/2002 | Starner et al. | 280/728.2 |
| 6,467,834 B1 | * | 10/2002 | Barz et al. | 296/187 |

FOREIGN PATENT DOCUMENTS

| | | |
|---|---|---|
| DE | 35 02 574 C1 | 8/1986 |
| DE | 44 38 190 C1 | 11/1995 |
| DE | 196 48 164 A1 | 5/1998 |
| DE | 198 38 955 A1 | 3/2000 |
| DE | 100 16 150 A1 | 10/2001 |
| EP | 0 189 819 | 8/1986 |
| EP | 1 193 137 A2 | 4/2002 |
| FR | 0 815 925 | 5/2002 |
| JP | 8-85344 A | 4/1996 |

* cited by examiner

*Primary Examiner*—D. Glenn Dayoan
*Assistant Examiner*—Greg Blankenship
(74) *Attorney, Agent, or Firm*—Nixon Peabody LLP; Donald R. Studebaker

(57) ABSTRACT

A car body structure for a convertible car that has a folding roof and a transparent windshield covering an front window opening comprises a door opening and closing a door opening in a side body section and a pillar member extending almost vertically from the side body section so as to support each side of the transparent windshield. The pillar member is positioned behind the front window opening so that the transparent windshield extends near besides occupants sitting on a seat of the car.

30 Claims, 22 Drawing Sheets

BODY STRUCTURE FOR CONVERTIBLE CAR

BACKGROUND OF THE INVENTION

1. Field of the Invention

The present invention relates to a body structure for a convertible car.

2. Description of Related Art

One of known open cars is a convertible type having a folding or removable roof that is disclosed, for example, in U.S. Pat. No. 5,584,422. While on the other hand the convertible car having a folding roof is advantageous to noise reduction and improvement of safety in addition to a more attractive outer appearance as compared with convertible cars having a canvas hood while the hard roof is unfolded, the convertible car is somewhat difficult to secure reliable occupants' safety upon an occurrence of a turnover of the car while the hard roof is unfolded.

An open car having a structure incorporated with the intention of securing occupants' safety is disclosed, for example, in Deutschland Pat. No. 3502574. The safety structure comprises a window frame for what is called a triangular window (a windbreaker or front ventilator window) mounted to a door and lock mechanism operative to lock the window frame to a car body upon an occurrence of a turnover of the car. The window frame locked to the car body bears the weight of the car body upon an occurrence of a turnover of the car, so as thereby to secure occupants' safety.

A triangular window in a window frame mounted to a door of an open car blocks occupants' vision in an obliquely forward direction of occupants and hinders visual recognition while running.

SUMMARY OF THE INVENTION

It is an object of the present invention to provide a car body for a convertible car having a folding roof and a transparent windshield covering a front window opening that provides occupants with broad obliquely forward vision and improved visual recognition in addition to a strong feeling of openness It is another object of the present invention to provide a car body for a convertible car having a folding roof and a transparent windshield covering a front window opening that is improved in structural rigidity so as to increase occupants' safety upon an occurrence of a turnover of the car.

The aforesaid objects of the present invention are s accomplished by a body structure for a car having a folding roof and a transparent windshield covering an front window opening that comprises a side body section having a door opening, a door opening and closing the door opening, and a windshield pillar extending almost vertically from the side body section so as to support each of opposite sides of the transparent windshield. The windshield pillar is positioned behind the front window opening and on one side of an occupant of the car.

According to the car body, the front window opening is closed by fitting the transparent windshield to the windshield pillar is positioned behind the front window opening and on one side of an occupant of the car, there is no necessity for the car body to have a windbreaker or front ventilator window, i.e. what is called a triangular window, that the conventional open cars are provided with. As a result, the obliquely forward vision, and hence visual recognition, is increased and a feeling of openness is strengthened, in particular, while running as an open car.

The obliquely forward vision, and hence the visual recognition, and the feeling of openness are considerably improved by positioning the windshield pillar behind a front end of the door opening in a lengthwise direction from the front to the back of the car body.

The windshield pillar may be positioned above an upper end of the door closing the door opening. This makes the door to bear partially an external load applied to the windshield pillar upon an occurrence of a turnover of the car, so as to increase occupants' safety. Further, the transparent windshield may be secured to the windshield pillar at an outer side in a transverse direction of the car body. This structure avoids irregularities of an outer surface of the side body, so as to provide the car body with an even outer surface at the side that leads to an attractive side appearance and improved aerodynamic characteristics of the car body.

The windshield pillar has a closed cross section so as to receive a windshield pillar reinforcement therein such as made of a hydroformed pipe or a foam packed structure. This reinforced windshield pillar is compact although having an increased rigidity. The windshield pillar reinforcement of hydroformed pipe is light in weight, high in structural rigidity and predominant in formability. On the other hand, the foam packed structure is light in weight and high in structural rigidity.

The body structure further comprises at least one of side body reinforcements incorporated in rigid structural parts of the side body section of the car body such as a hinge pillar that are formed by outer and inner panel members secured to each other so as to form a closed cross section so as to receive the side body reinforcement. The side body reinforcement may be incorporated in either one or both of a rigid structural member that continuously extends from the windshield pillar as one integral piece such as a door hinge pillar and the side body that functions as a rigid structural part of the side body section when it is closed.

The side body reinforcement is connected to the windshield pillar reinforcement through a reinforcement extending in the lengthwise direction. Otherwise, the side body reinforcement is installed in and connected to the door so as to be in alignment with the windshield pillar in a vertical direction while the door is closed. In the case where the side body reinforcement is incorporated in the door hinge pillar as a rigid structural member that extends continuously from the windshield pillar as one integral piece, the side body reinforcement is continuous from the windshield pillar reinforcement and connected to the door hinge pillar. In this instance, the door hinge pillar may comprise outer and inner panel members secured to each other so as to form a closed cross section within which the side body reinforcement is disposed.

The body structure with the side body reinforcement, that is installed in the door hinge pillar or in the door, makes a side shill as a rigid structural member to receive the external load transmitted to the side body reinforcement through the windshield pillar upon an occurrence of a turnover of the car. This makes occupants' safety more reliable. Further, the side body reinforcement that is disposed between outer and inner panel members forming a rigid body member such as the door hinge pillar and the door effectively transmits the external load to the rigid body members upon an occurrence of a turnover of the car. In addition, the side body reinforcement increases an impact load resistance of the side body section including the door upon an occurrence of a side collision, in addition to increasing the rigidity of side body section.

According to another aspect of the present invention, the car body is equipped with a pop-out type tip-over protection structure The pop-out type tip-over protective structure comprises turnover detection means for detecting a turnover of the car body such as, for example, a gravity sensitive switch and a mercury switch, a guard strut received for slide movement in the windshield pillar and lock means for locking the guard strut popped out. The guard strut pops out partly of the windshield pillar when the turnover detection means detects a turnover of the car body so as thereby to bear weight of the car body when the car overturns.

The pop-out type tip-over protection structure installed in the windshield pillar not only causes no aggravation of attractive outer appearance of the car body but also makes it possible to lower a top of the windshield with the intention of strengthening a feeling of openness. In addition, The pop-out type tip-over protection structure popping out partly of the windshield pillar makes occupants' safety more reliable upon an occurrence of a turnover of the car.

BRIEF DESCRIPTION OF THE DRAWINGS

The foregoing objects and features of the present invention will be clearly understood from the following description with respect to preferred embodiments thereof when considered in conjunction with the accompanying drawings, wherein the same reference numerals have been used to denote parts or elements similar in structure and operation throughout the drawings, and in which:

FIG. 18 is a cross-sectional view of the pop-out type tip-over protective structure in which a guard strut is retracted in;

FIG. 24 is a cross-sectional view of a variant of the pop-out type tip-over protective structure in which the guard strut is retracted in.

DETAILED DESCRIPTION OF THE PREFERRED EMBODIMENTS

Figure 1:
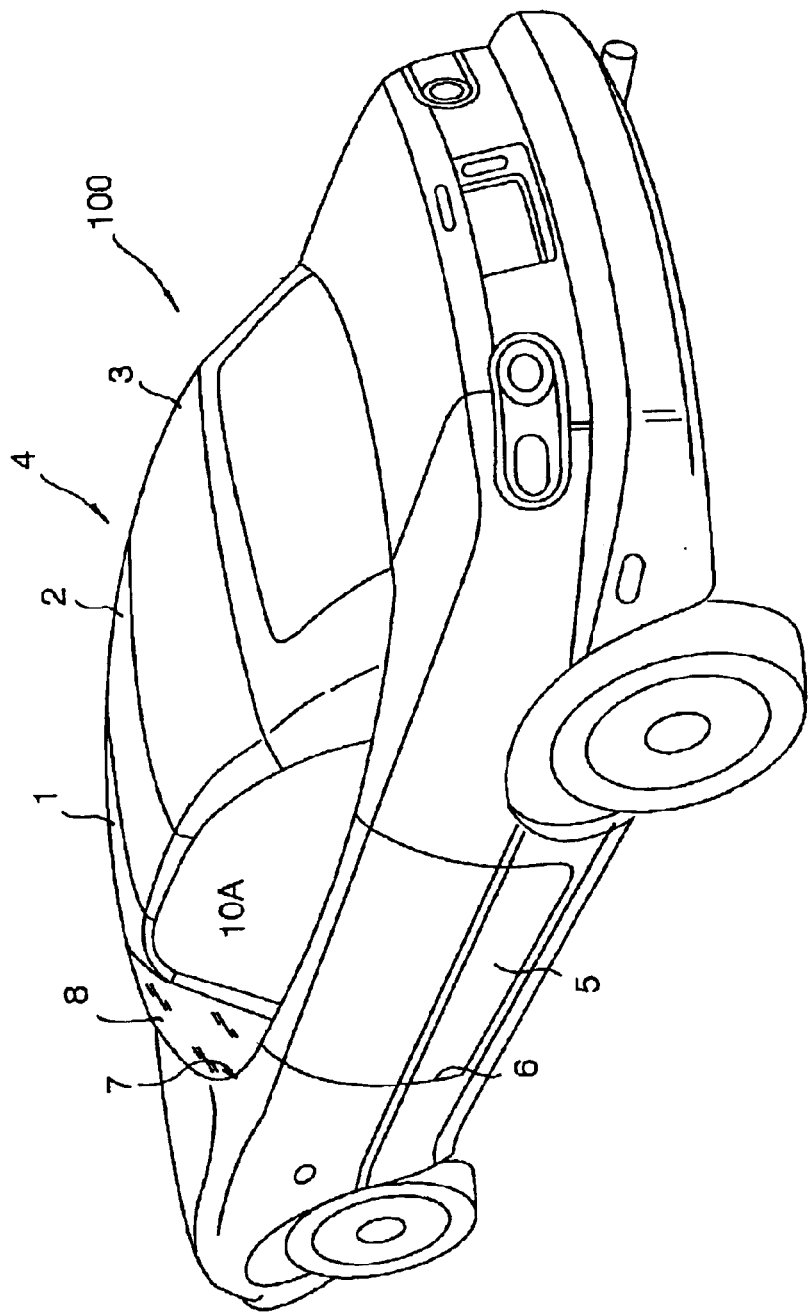
FIG. 1 is a perspective view of a convertible car having a side body structure according to an embodiment of the present invention.
Figure 2:
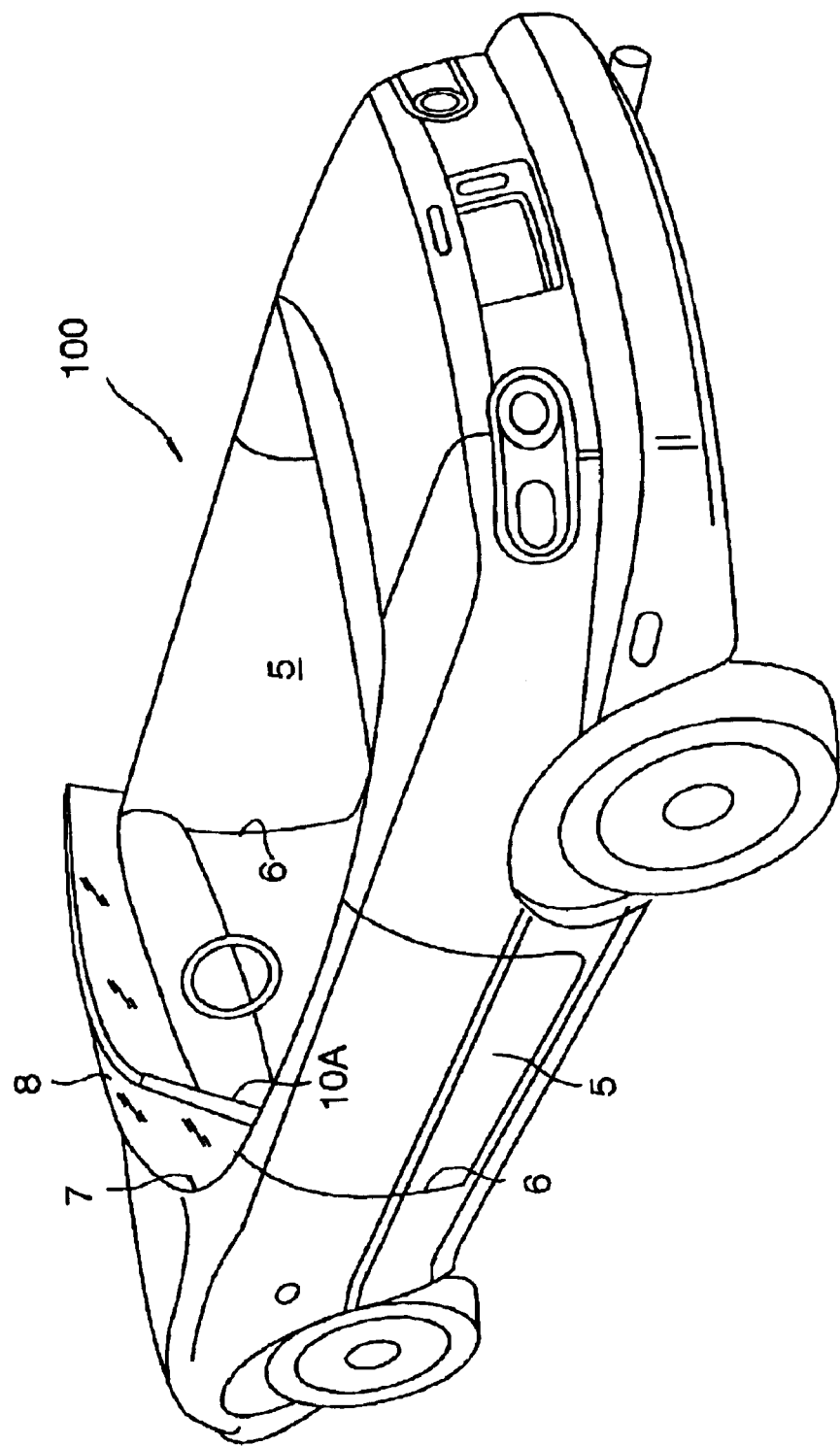
FIG. 2 is a perspective view of the convertible car with a folding hard roof unfolded.

Referring to the drawings in detail, and, in particular to FIGS. 1 and 2 showing a convertible car that has a side body structure according to an embodiment of the present invention, a car body 100 of the convertible car has a folding or removable hard roof 4 comprising a plurality of, for example three, separate roof sections 1, 2 and 3. As shown in FIG. 2, the convertible car can drive as an open car when the folding hard roof 4 is unfolded. The car body 100 of the convertible car at its opposite sides has entrance/exit openings 6 that are opened and closed by doors 5 (one of which is hidden), respectively. Further, the car body 100 is provided with a front window opening defined by an upper horizontal or belt line frame section 10B extending in a lengthwise direction from the front to the back of the car body 100 and located in front of occupants, a driver and a passenger, sitting on front seats (not shown). The belt line frame section 10B is ended by a frame section, namely a windshield pillar section 10A, extending approximately vertically upward at a side of the car body 100 beside the occupants. A transparent windshield 8 such as a glass plate and a reinforced plastic plate is fitted in the upper horizontal frame section, namely a belt line frame section 10B, so as to screen the occupants sitting on the front seats from wind from both front and sides.

Figure 3:
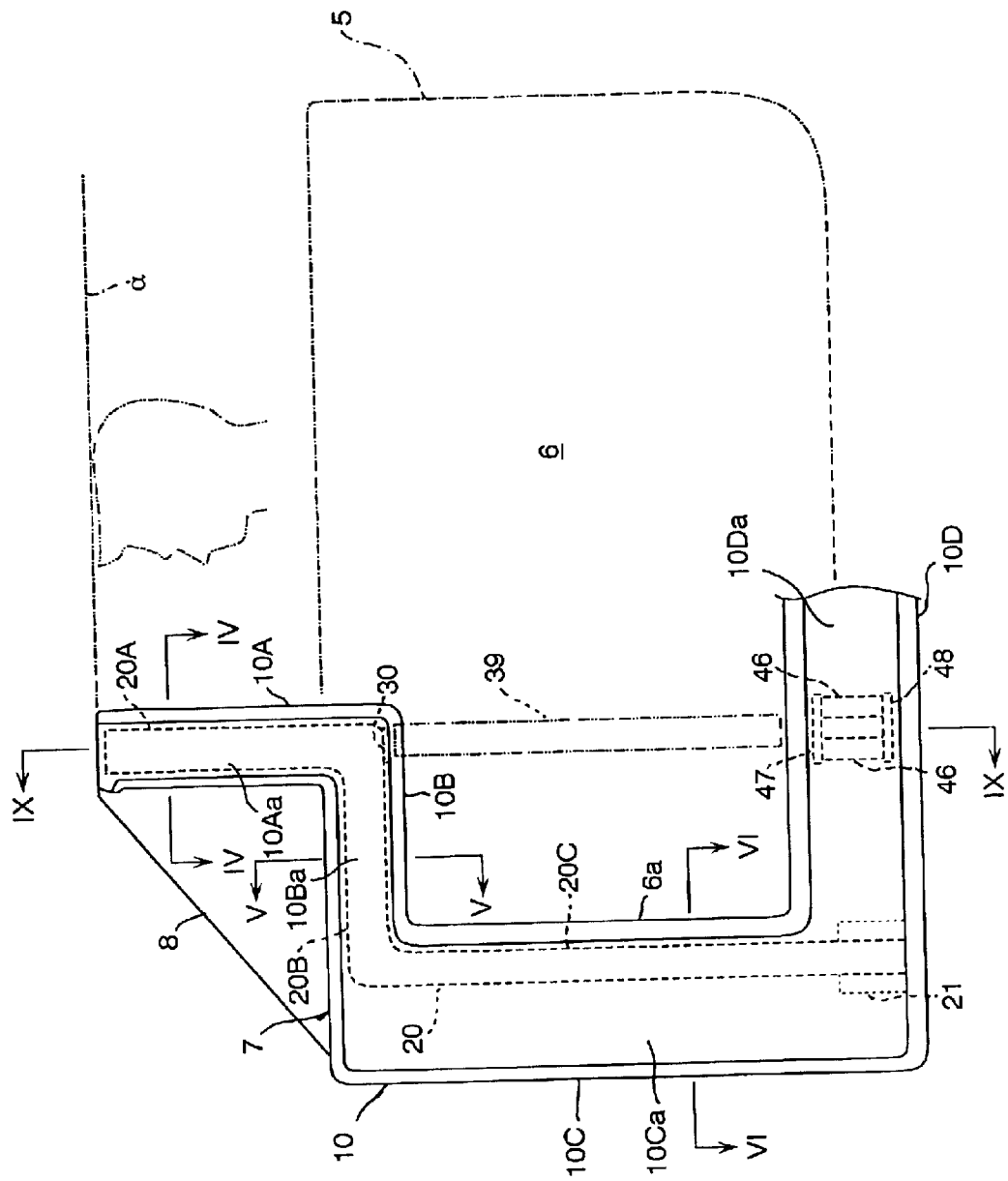
FIG. 3 is a side view of a side body section of the convertible.

As seen in FIG. 3 showing a front part of the car body 100, the car body 100 has a rigid frame 10 comprises a lower vertical frame section or door hinge pillar section 10C and a lower horizontal frame section or side shill section 10D in addition to the upper vertical frame section or windshield pillar section 10A and the upper horizontal frame section or belt line section 10B forming the front window opening 7, all the frame sections being formed as one integral piece. The windshield pillar section 10A is located behind a front end 6a of the entrance/exit opening 6 and extends to a height indicated by a line that is almost even with a top of a head of an occupant sitting on the seat who has an average height. While the windshield 8 fitted in the belt line frame section 10B screens the occupants sitting on the seats from wind from the front and the sides during running with the folding hard roof 4 unfolded, it makes the occupants to feel increased openness. The door 5 works as a rigid structural member of a side body section of the car body 100 when it is closed. The car body 100 is provided with a side body reinforcement 20, a side shill reinforcement 46 forming a separate part of the side body reinforcement 20 and disposed in the rigid frame 10, and a door reinforcement 39 forming a separate part of the side body reinforcement 20 and disposed in the door 5. The side body reinforcement 20 comprises an upper vertical reinforcement section or windshield pillar reinforcement section 20A, a horizontal reinforcement section or belt line frame reinforcement section 20B continuously extending from the windshield pillar reinforcement section 20A and a lower vertical reinforcement section or door hinge pillar reinforcement section 20C continuously extending from the front end of the belt line frame reinforcement section 20B. The side body reinforcement 20 is preferably made of, for example, a single pipe produced using a hydroforming process.

Figure 4:
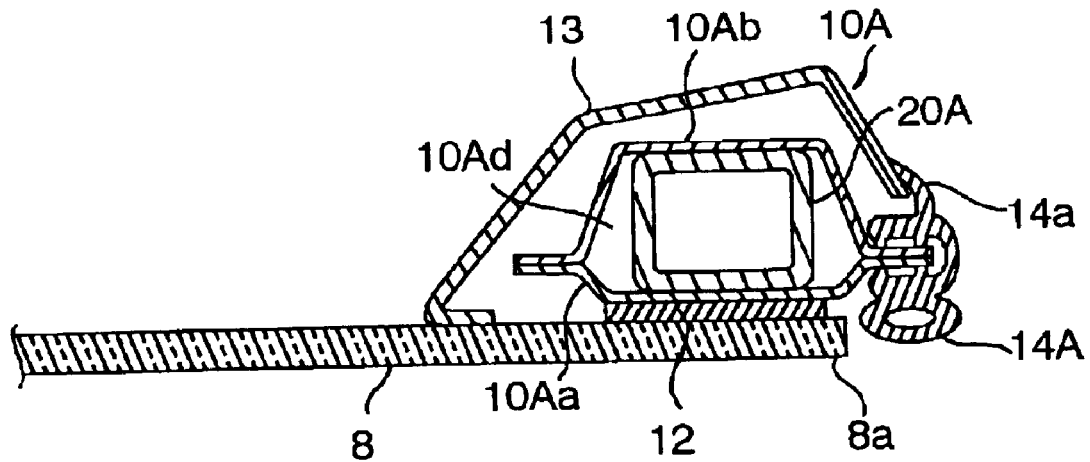
FIG. 4 is a cross-sectional view of the side body section taken along line IV—IV of FIG. 3.

FIG. 4 shows the windshield pillar section 10A in cross-section taken along line IV—IV of FIG. 3. As shown, the windshield pillar section 10A comprises a pillar outer panel 10Aa, a pillar inner panel 10Ab. These pillar outer and inner panels 10Aa and 10Ab are welded, or otherwise secured, to each other so as to form a closed cross section 10Ac in which the windshield pillar reinforcement section 20A of the side body reinforcement 20 is disposed. In the case where the side body reinforcement 20 comprises a hydroformed pipe, the side body reinforcement 20 is light in weight, high in structural rigidity and advantageous to formability. Further, the windshield pillar section 10A within which the windshield pillar reinforcement section 20A of the side body reinforcement 20 is disposed is significantly improved in structural rigidity resulting from additive effects of the closed cross section of the windshield pillar section 10A and the hydroformed windshield pillar reinforcement section 20A.

The pillar outer and inner members 10Aa and 10Ab at their rear flanges are sealed with a sealing member 14A having a rip 14a such as a weather strip. The windshield 8 at a rear end part 8a is fixedly adhered to the pillar outer panel 10Aa through an adhesive layer 12 so as to conceal the windshield pillar section 10A from the outside of the car body 100. This connecting structure between the windshield 8 and the windshield pillar section 10A avoids irregularities of an outer surface of the side body section or provides the car body 100 with an even outer surface at the side that leads to an attractive outer appearance of the car body 100 and improves aerodynamic characteristics of the car body 100. The windshield pillar section 10A is further provided with a trim member 13 secured at opposite ends to the windshield 8 and the rip 14a of the sealing member 14A, respectively, from the inside of the car body 100, so as to conceal the windshield pillar section 10A, in particular the pillar inner panel 10Ab.

Figure 5:
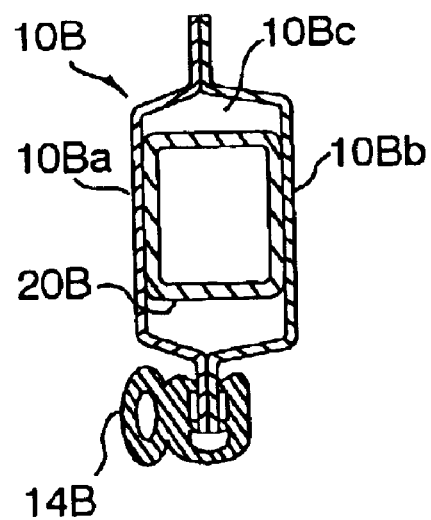
FIG. 5 is a cross-sectional view of the side body section taken along line V—V of FIG. 3.

FIG. 5 shows the upper horizontal frame section or belt line frame section 10B in cross-section taken along line V—V of FIG. 3. As shown, the belt line frame section 10B comprises a belt line outer panel 10Ba and a belt line inner panel 10Bb. These belt line outer and inner panels 10Ba and 10Bb are welded, or otherwise secured, to each other so as to form a closed cross section 10Bc extending in the lengthwise direction in which the belt line frame reinforcement section 20B of the side body reinforcement 20 is disposed. The belt line outer panel 10Ba may be formed as an integral piece with the pillar outer panel 10Aa or may be fixedly united as one whole with the pillar outer panel 10Aa. Similarly, the belt line inner panel 10Bb may be formed as an integral piece with the pillar inner panel 10Ab or may be fixedly united as one whole with the pillar inner panel 10Ab. The belt line outer and inner members 10Ba and 10Bb at their lower flanges are sealed with a sealing member 14B such as a weather strip. This sealing member 14B may be formed as an integral piece with the sealing member 14A or may be fixedly united as one whole with the sealing member 14A.

Figure 6:
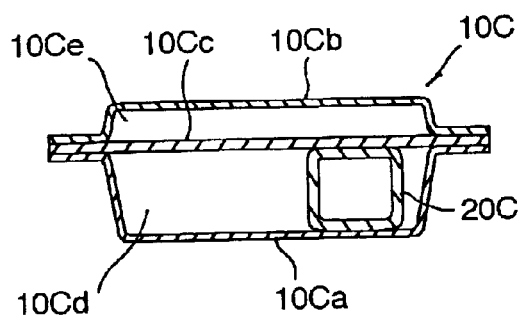
FIG. 6 is a cross-sectional view of the side body section taken along line VI—VI of FIG. 3.
Figure 7:
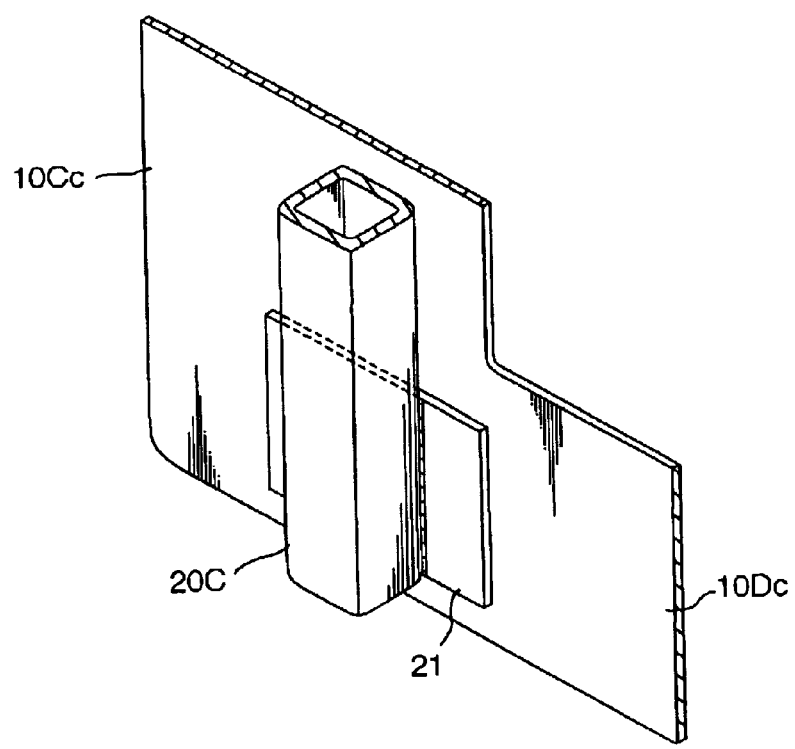
FIG. 7 is a perspective view of a connecting structure between a frame and a body reinforcement.

FIG. 6 shows the door hinge pillar section 10C in cross-section taken along line VI—VI of FIG. 3. As shown, the door hinge pillar section 10C, which functions to mount upper and lower door hinges 22 (see FIG. 8) of the door 5 thereto, comprises a hinge pillar outer panel 10Ca, a hinge pillar inner panel 10Cb and a hinge pillar reinforcement panel 10Cc. These hinge pillar outer and inner panels 10Ca and 10Cb are welded, or otherwise secured, to each other through the hinge pillar reinforcement panel 10Cc so as to form an outer closed cross section 10Cd and an inner closed cross section 10Ce. The door hinge pillar reinforcement section 20C of the side body reinforcement 20 is disposed within the outer closed cross section 10Cc of the door hinge pillar section 10C. The door hinge pillar reinforcement section 20C continuously extends from the belt line frame reinforcement 20B to the lower horizontal frame section or side shill section 10D. As shown in FIG. 7, the door hinge pillar reinforcement section 20C of the side body reinforcement 20 is secured to the hinge pillar reinforcement 10Cc through a connecting flange 21 welded to the hinge pillar reinforcement section 20C of the side body reinforcement 20 and to the bottom of the side shill section 10D of the frame 10 using spot-welding. The hinge pillar outer panel 10Ca may be formed as an integral piece with the belt line outer panel 10Ba or may be fixedly united as one whole with the belt line outer panel 10Ba. Similarly, the hinge pillar inner panel 10Cb may be formed as an integral piece with the belt line inner panel 10Bb or may be fixedly united as one whole with the belt line inner panel 10Bb.

Figure 8:
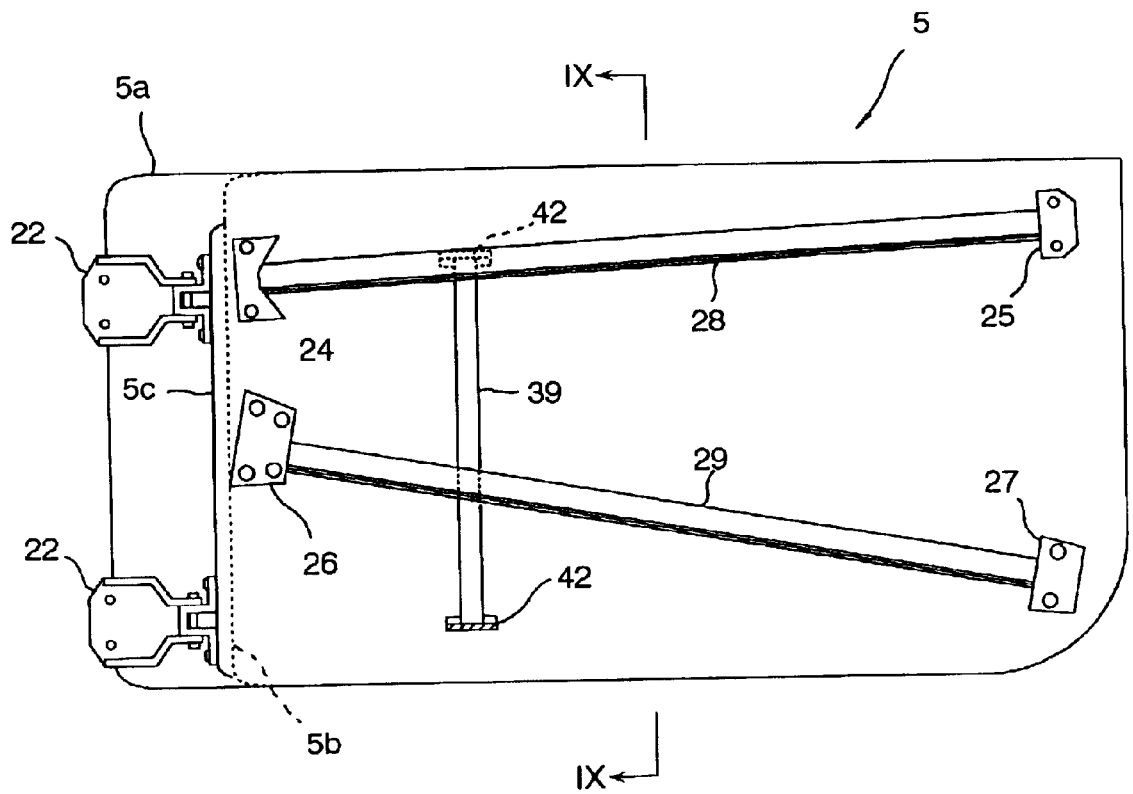
FIG. 8 is a schematic side view of a door.

FIG. 8 schematically shows the door 5. As shown, the door 5 comprises door outer panel 5a and a door inner panel 5b. The door inner panel 5b at its front end is formed with a vertical shoulder 5c where upper and lower door hinges 22 are secured. The door 5 is provided with an upper impact bar 28 extending substantially horizontally in the lengthwise direction and supported by brackets 24 and 25 secured to the door inner panel 5b and a lower impact bar 29 extending rearward down in the lengthwise direction and supported by brackets 26 and 27 secured to the door inner panel 5b. These upper and lower impact bars 28 and 29 increase an impact load resistance of the door upon an occurrence of a side collision.

Figure 9:
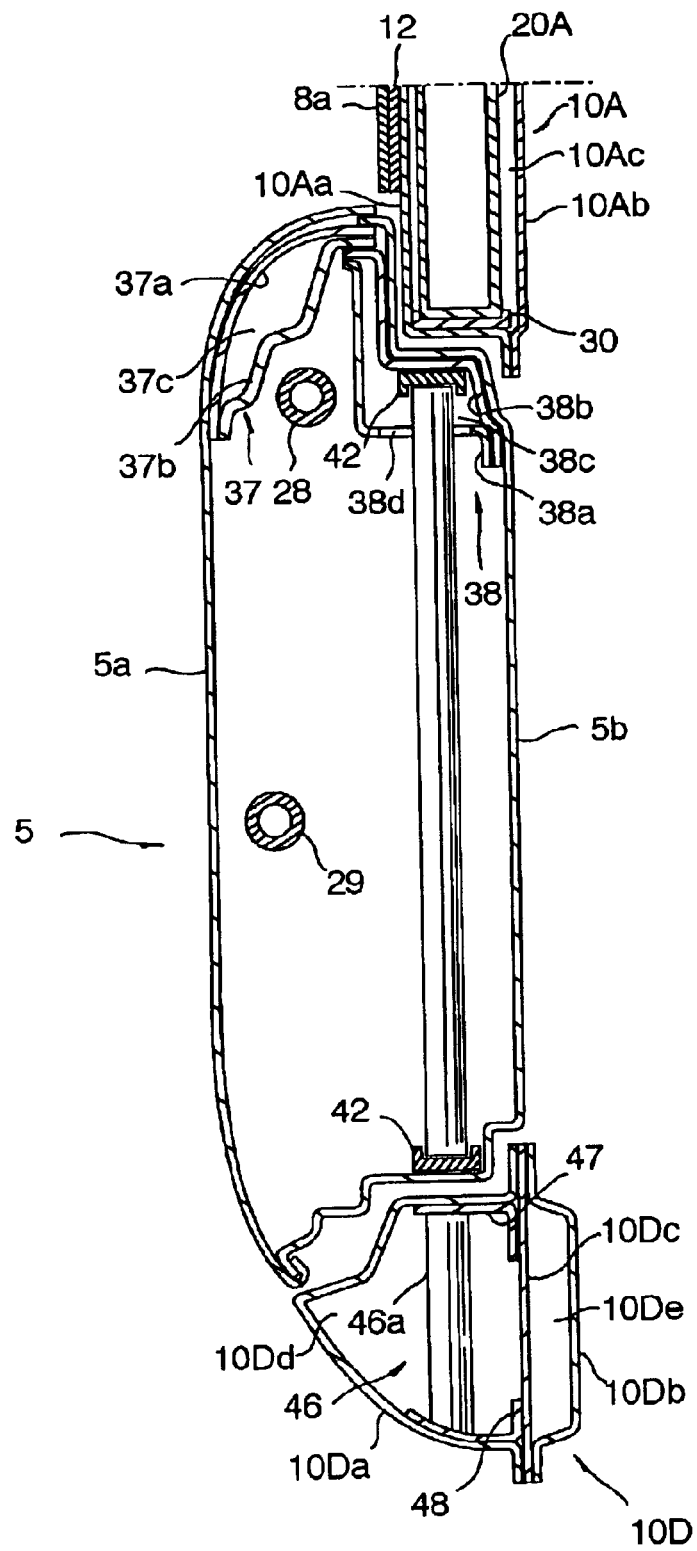
FIG. 9 is a cross-sectional view of the side body section taken along line IX—IX of FIG. 3.

FIG. 9 shows the door 5 in vertical cross section taken along line IX—IX of FIG. 8. As shown, the windshield pillar reinforcement section 20A at the lower part is secured to a retainer 30 secured to the bottom of the windshield pillar section 10A in the closed cross section 10Ac and positioned vertically so as to overlap an upper stepped side 5d of the door 5 along a specified length. The partly overlapping structure between the windshield pillar section 10A and the door 5 is advantageous to transmitting an impact load received by the windshield pillar section 10A and the windshield pillar reinforcement section 20A to the door 5 upon an occurrence of a turnover of the car.

Figure 10:
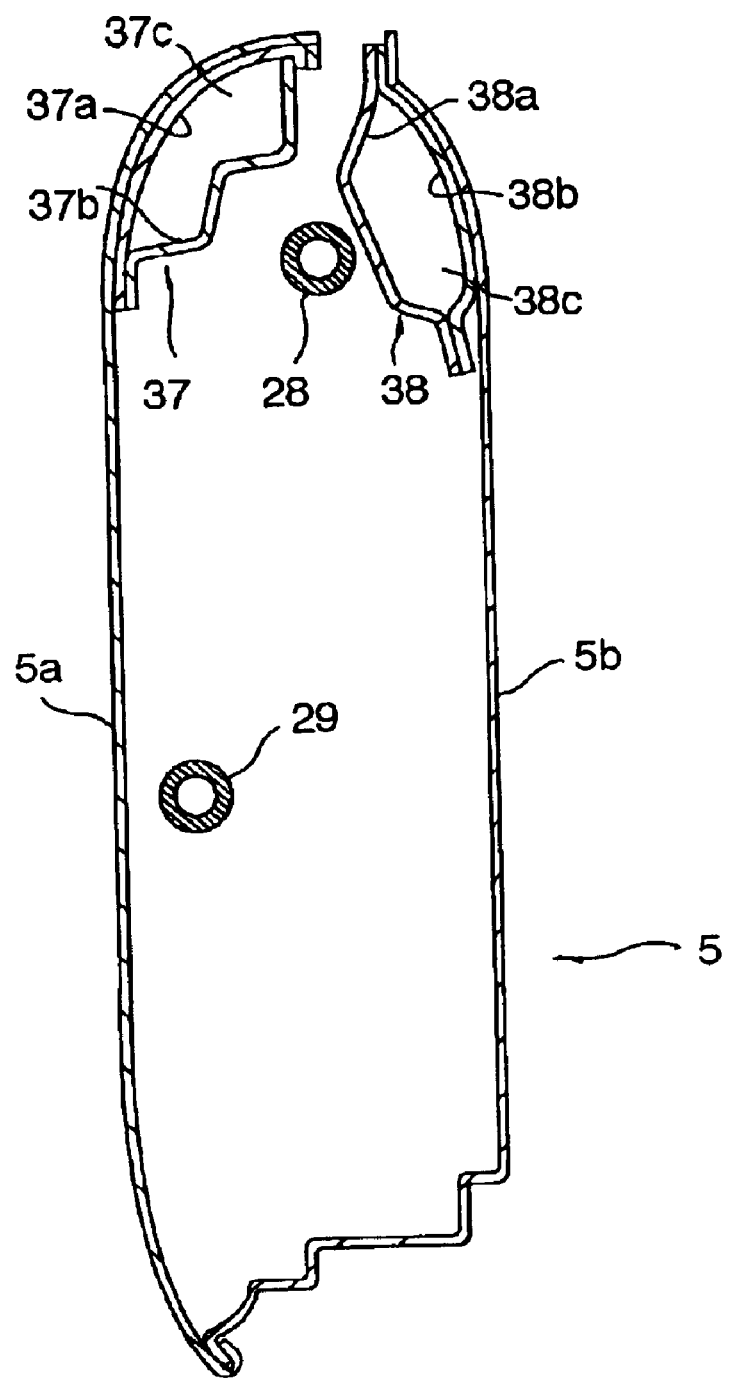
FIG. 10 is a cross-sectional view of the side body section taken along line X—X of FIG. 8.

As shown in FIG. 10, the door 5 is provided with a door outer reinforcement 37 and a door inner reinforcement 38 both of which extend in the lengthwise direction in the interior of the door 5. The door outer reinforcement 37 comprises an outer reinforcement member 37a secured to the door outer panel 5a and an inner reinforcement member 37b secured to the outer reinforcement member 37a so as to form a closed cross section 37c. Similarly, the door inner reinforcement 38 comprises an inner reinforcement member 38b secured to the door inner panel 5b and an outer reinforcement member 38a secured to the inner reinforcement member 38b so as to form a closed cross section 38c. As seen in FIGS. 3, 8 and 9, the door 5 is further provided with a door reinforcement bar 39 of a metal pipe in the interior thereof. The door reinforcement bar 39 extends vertically and is positioned so as to be in alignment with the windshield pillar reinforcement section 20A in a vertical direction and to be somewhat far away from both upper and lower impact bar 28 and 29 in the transverse direction. The door reinforcement bar 39 extends passing though an opening 38d formed in the outer reinforcement member 38a of the door inner reinforcement 38 and is secured at opposite ends to the inner reinforcement member 38b of the door inner reinforcement 38 and the lower end of the door inner panel 5b through upper and lower retainers 42, respectively. Part of the door 5 around the door reinforcement bar 39 adjacent to the windshield pillar reinforcement section 20A is structurally strengthened by the door inner reinforcement 38.

Figure 11:
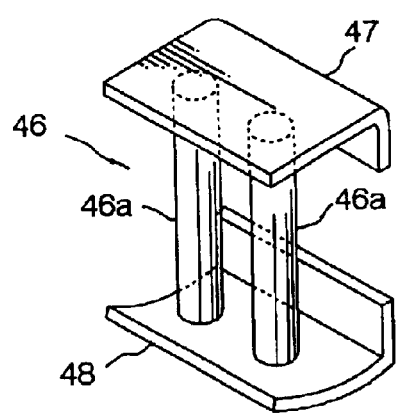
FIG. 11 is a perspective view of a body reinforcement disposed in a side shill.

The side shill 10D of the frame 10 that works as a rigid structure forming the side body comprises a side shill outer panel 10Da, a side shill inner panel 10Db and a side shill reinforcement panel 10Dc. These side shill outer and inner panels 10Da and 10Db are welded, or otherwise secured, to each other through the side shill reinforcement panel 10Dc so as to form closed cross section 10Dd and 10De extending in the lengthwise direction in which the side shill reinforcement 46. As shown in FIGS. 3, 9 and 11, the side shill reinforcement 46 comprises a pair of side shill reinforcement bars 46a made of metal pipe. The side shill reinforcement bars 46a extend vertically in parallel to each other and are positioned so as to be on opposite sides of the door reinforcement bar 39 in the lengthwise direction. The side shill reinforcement bars 46a are secured at opposite ends to generally L-shaped upper and lower retainers 47 and 48, respectively, both of which are secured to the side shill reinforcement panel 10Dc and the side shill outer panel 10Da. This internal structure of the side shill section 10D increases a structural rigidity of the side body section corresponding in position to a part of the door 5 where the door reinforcement bar 39 is installed.

According to the side body structure, since the front window opening 7 is closed by fitting the transparent windshield 8 to the windshield pillar section 10A of the frame 10 that is located somewhat rearward of the side body section, there is no necessity for the car body 100 to have a triangular window (a windbreaker or front ventilator glass) that the conventional cars are provided with. While this provides the occupants with broad forward and side vision and, in consequent, an improved visible recognition and a strong feeling of openness. In particular, when running as an open car, the feeling of openness is significantly strengthened.

Figure 12:
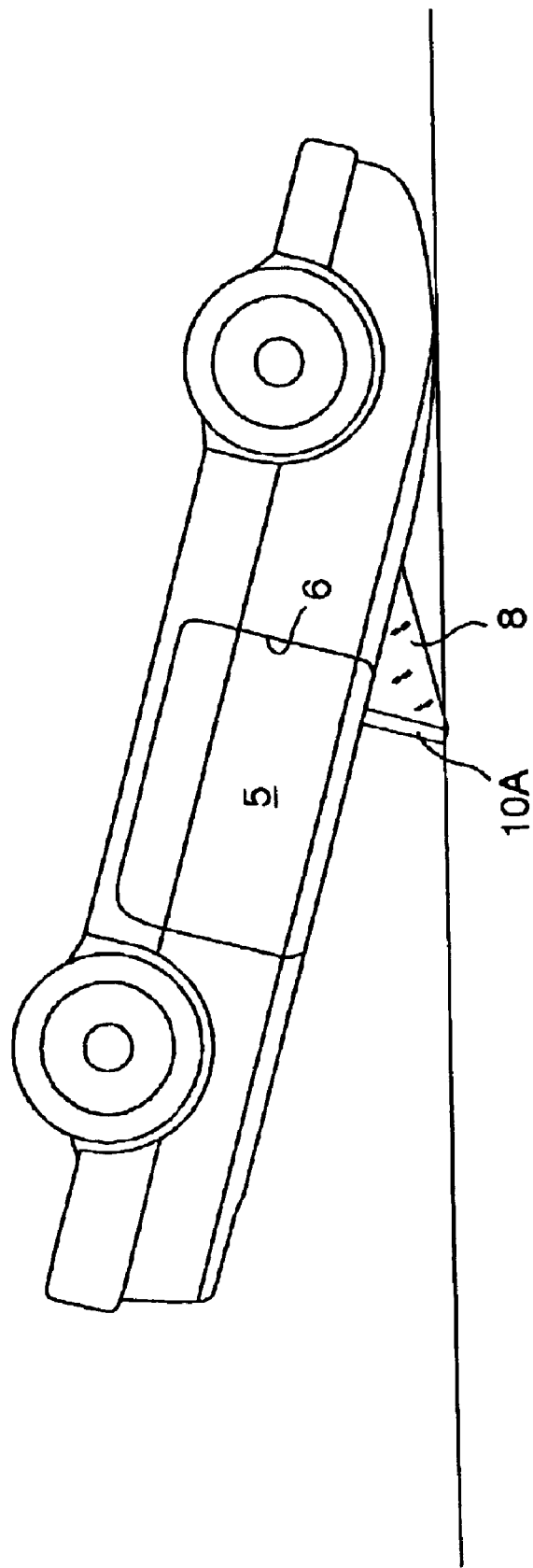
FIG. 12 is a view of the convertible car in an event of a turnover.

In the event where the car turns upside down as shown in FIG. 12, the windshield pillar section 10A of the frame 10 can receive an external load. As was previously described, the windshield pillar section 10A is accompanied by the windshield pillar reinforcement section 20A of the side body reinforcement 20 that is connected to the door hinge pillar section 10C as a member of the rigid body structure through the reinforcement section 20B and 20C and is positioned in alignment with and in close proximity to the door reinforcement rod 39 of the door 5 with the lower end supported on the side shill section 10D of the frame 10. This structure divides an external load received by the windshield pillar 10A into two parts, one of which is transmitted to the hinge pillar section 10C and the other of which is transmitted to the section 10D through the door reinforcement rod 39. Therefore, the car body 100 secures occupants' safety reliably. The side body reinforcement 20 comprising the three reinforcement sections 20A, 20B and 20C and disposed in the frame 10 can securely receive an external load even when the door 5 accidentally opens upon an occurrence of a turnover of the car.

The car body 100 having the front window opening 7 comprises the windshield 8 closing the front window opening 7 and the windshield pillars 10A that are disposed at positions somewhat rearward in the lengthwise direction so as to support opposite sides of the transparent windshield 8. The car body 100 thus constructed makes it unnecessary to have a triangular window that the conventional car body is provided with. The car body 100 having no triangular windows provides the occupants with broad obliquely forward vision, that leads to improved visual recognition, and a strong feeling of openness. In addition, the windshield pillar sections 10A extending substantially vertically secure occupants' safety upon an occurrence of a turnover of the car.

The windshield pillar section 10A positioned behind the front end 6a of the entrance/exit opening 6 in the lengthwise direction provides the occupants with more broad obliquely forward vision that leads to improved visible recognition and a strong feeling of openness. In addition, the windshield pillars 10A is positioned above the door 5 so as to partly overlap the upper stepped sides 5c of the doors 5 in vertical position, so that the doors 5 can bear partly the external load received by the windshield pillars 10A. The car body 100 thus structured secures occupants' safety more effectively.

The windshield 8 at each of the opposite sides overlaps and secured to the windshield pillar section 10A. This overlapping structure between the windshield 8 and the windshield pillar section 10A avoids irregularities of an outer surface of the side body section, in other words, provides the car body 100 with an even outer surface at the side that leads to an attractive appearance of the car body 100 and improves aerodynamic characteristics of the car body 100. In addition, the windshield pillar section 10A is accompanied by the windshield pillar reinforcement section 20A of the side body reinforcement 20 disposed in the closed cross section 10Ac, so that the windshields pillar section 10A is improved in structural stiffness while it is compact in structure.

The foregoing effects are particularly strengthened when the car runs as an open car with the hard roof 4 unfolded.

Figure 13:
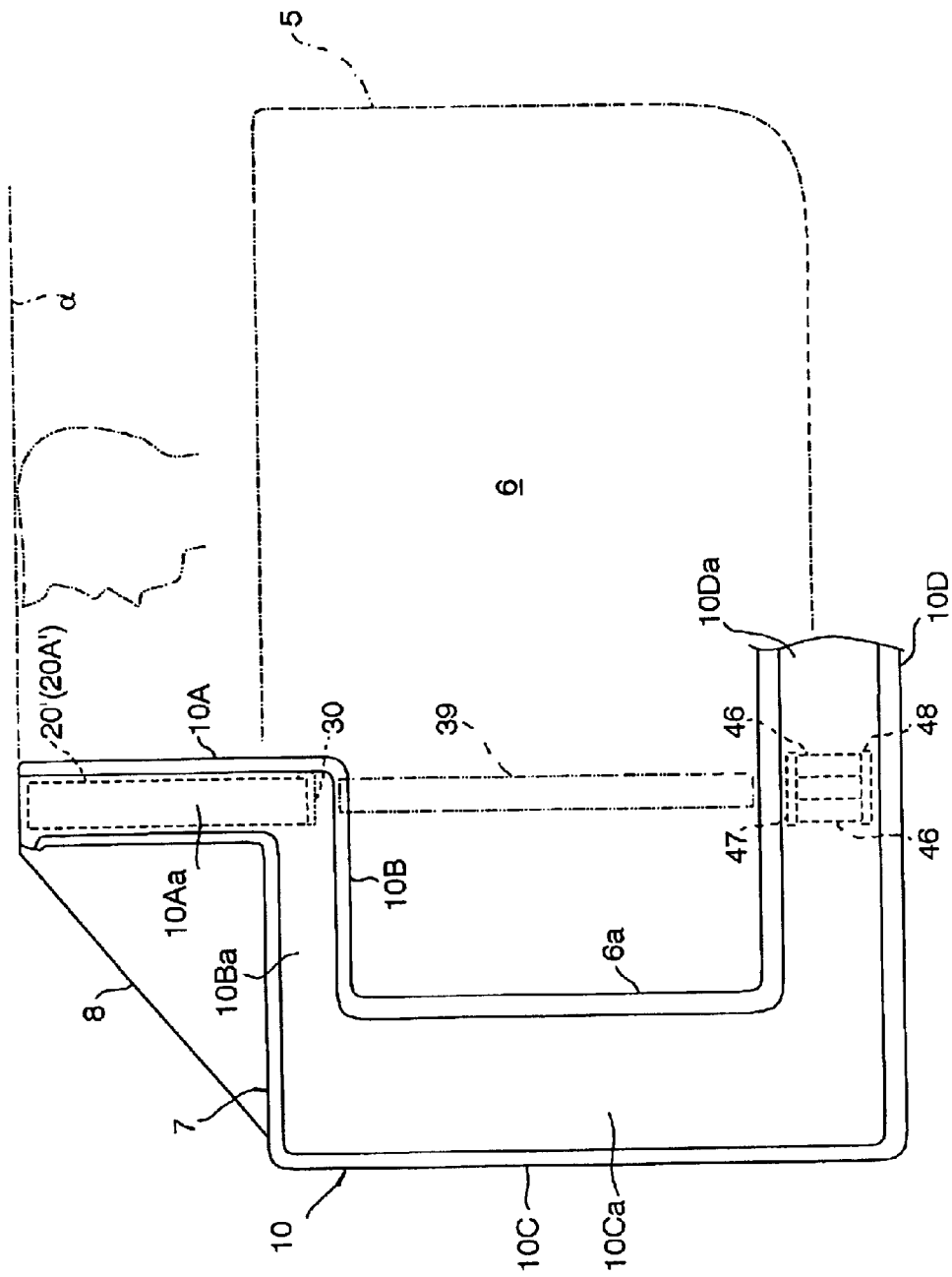
FIG. 13 is a side view of a side body structure of the convertible car according to another embodiment of the present invention.
Figure 14:
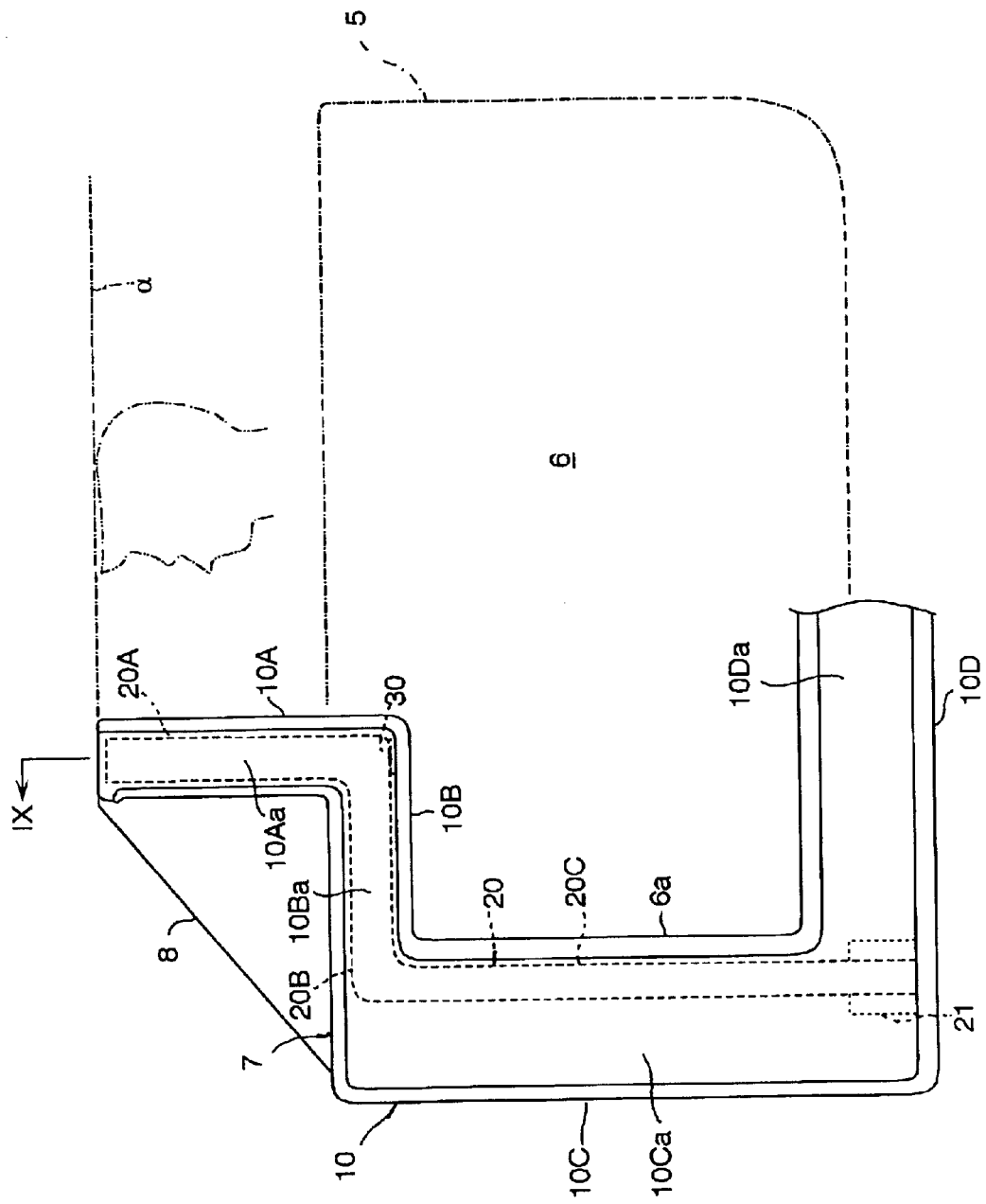
FIG. 14 is a side view of a side body structure of the convertible car according to another embodiment of the present invention.

The car body 100 may be provided with a body reinforcement simplified in structure as shown in FIG. 13 or 14.

As shown in FIG. 13, the car body 100 has a rigid frame 10 comprising an windshield pillar section 10A, an belt line frame section 10B, a door hinge pillar section 10C and a side shill section 10D, all the frame sections being formed as one integral piece and similar in structure and operation to those of the side body reinforcement 20' shown in FIG. 3. The frame 10 is provided with a side body reinforcement 20' disposed within the windshield pillar 10A of the frame 10. The side body reinforcement 20' comprises an upper vertical reinforcement or windshield pillar reinforcement 20A' that is made of a single hydroformed pipe and similar in structure and operation to the windshield pillar reinforcement section 20A of the body reinforcement 20 of FIG. 3. A side shell reinforcement 46 is provided in the side shill section 10D of the frame 10 separately from the side body reinforcement 20, i.e. the windshield pillar reinforcement 20A. The side shell reinforcement 46 is just the same in structure and operation as the side shell reinforcement 46 of FIG. 3. As shown, the windshield pillar section 10A comprises a pillar outer panel 10Aa and a pillar inner panel (hidden by the pillar outer panel 10Aa) welded, or otherwise secured, to each other so as to form a closed cross section 10Ac. The side body reinforcement 20' (20A') is disposed within the windshield pillar section 10A and is secured at the lower end to the retainer 30 secured to the windshield pillar section 10A.

The side shill section 10D of the frame 10 is provided with a pair of side shill reinforcement 46 comprising a pair of side shill reinforcement bars 46a that are secured at opposite ends to generally L-shaped upper and lower retainers 47 and 48. The side shill reinforcement bars 46a extend vertically in parallel to each other and are positioned so as to be in substantial alignment with a door reinforcement bar 39 of a door 5 and the side body reinforcement 20' (20A').

The car body 100 having the body reinforcement 20' (20A') simplified as compared with that of FIG. 3 and the side shill reinforcement 46 aligned in vertical direction securely bears an external load upon an occurrence of a turnover of the car, so that the car body 100 secures occupants' safety as long as the door 5 is closed.

Further, as shown in FIG. 14, the car body 100 has a rigid frame 10 comprising an windshield pillar section 10A, an belt line frame section 10B, a door hinge pillar section 10C and a side shill section 10D, all the frame sections being formed as one integral piece and similar in structure and operation to those of the side body reinforcement 20 of FIG. 3. The frame 10 is provided with a side body reinforcement 20 but not provided with a side shill reinforcement nor a door reinforcement. The side body reinforcement 20, that is just the same as that of FIG. 3, comprises an windshield pillar reinforcement section 20A, a belt line frame reinforcement section 20B extending from the windshield pillar reinforcement section 20A and a door hinge pillar reinforcement section 20C extending from the front end of the belt line frame reinforcement section 20B, all the reinforcement sections being formed as one integral piece.

Although the car body 100 is provided with the side body reinforcement 20 in the rigid frame only and hence simplified as compared with that of FIG. 3, the rigid frame 10 provided with the side body reinforcement 20 bears an external load even in the event where the door 5 accidentally opens upon an occurrence of a turnover of the car, so that the car body 100 secures reliable occupants' safety.

Figure 15:
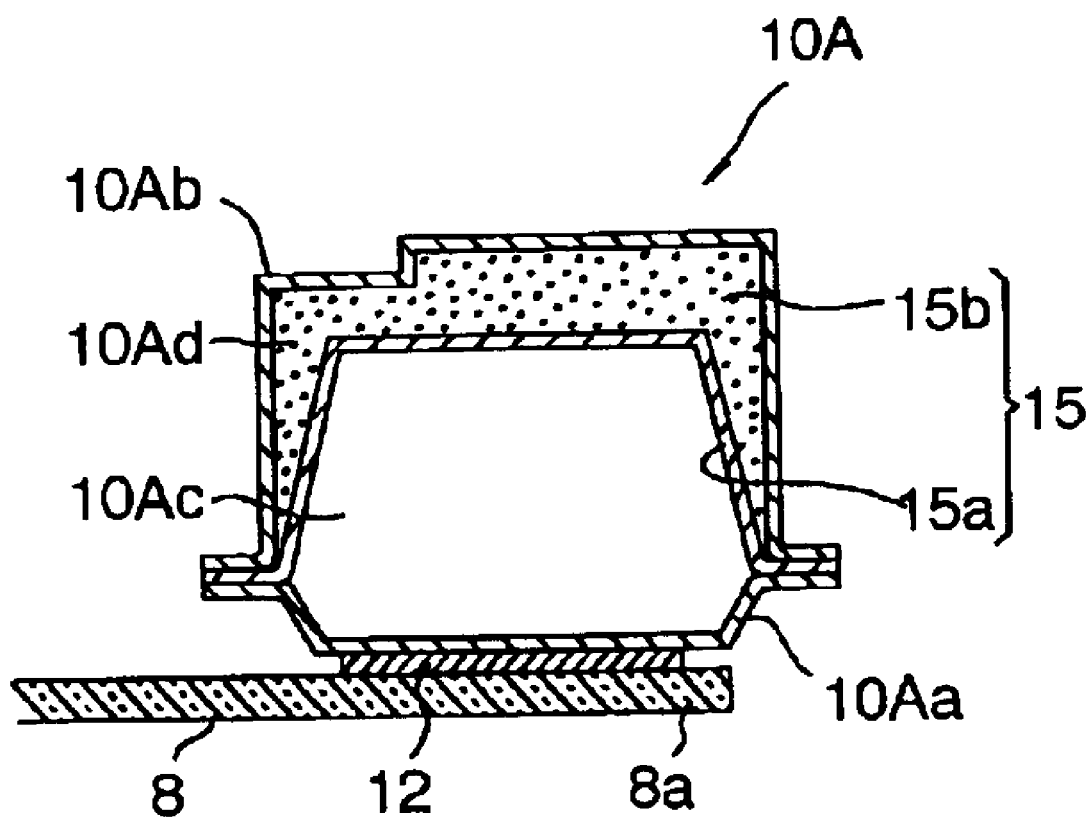
FIG. 15 is a cross-sectional view of a variant of a body reinforcement.

FIG. 15 shows a variant of the rigid frame 10, in particular the windshield pillar section 10A, of the frame 10 of the car body 100. As shown, the windshield pillar section 10A comprises a pillar outer panel 10Aa and a pillar inner panel 10Ab. A windshield pillar reinforcement 15 is installed in the windshield pillar section 10A. The windshield pillar reinforcement 15 comprises a pillar reinforcement panel 15a and a pillar reinforcement foam 15b. These pillar outer and inner panels 10Aa and 10Ab are welded, or otherwise secured, to each other through the pillar reinforcement panel 10Ac so as to form closed cross sections 10Ac and 10Ad in the windshield pillar section 10A, one at each of opposite sides of the pillar reinforcement panel 10Ac. The reinforcement foam 15b is packed in the space defined by the closed cross section 10Ae between the pillar inner panel 10Ab and the pillar reinforcement panel 10Ac. The reinforcement foam 15b is provided by heating a foaming rough material filled in the space so as to foam and solidify it during a painting process of the windshield pillar 10A. The car body 100 provided with the windshield pillar 10A and the windshield pillar reinforcement 15 incorporated in the windshield pillar 10A is light in weight while having a sufficient structural rigidity at the side body section.

Each or both of the belt line frame section 10B and the door hinge pillar section 10C of the frame 10 may be provided with the same reinforcing structure as the windshield pillar reinforcement 15 incorporated in the windshield frame section 10A shown in FIG. 15.

Figure 16:
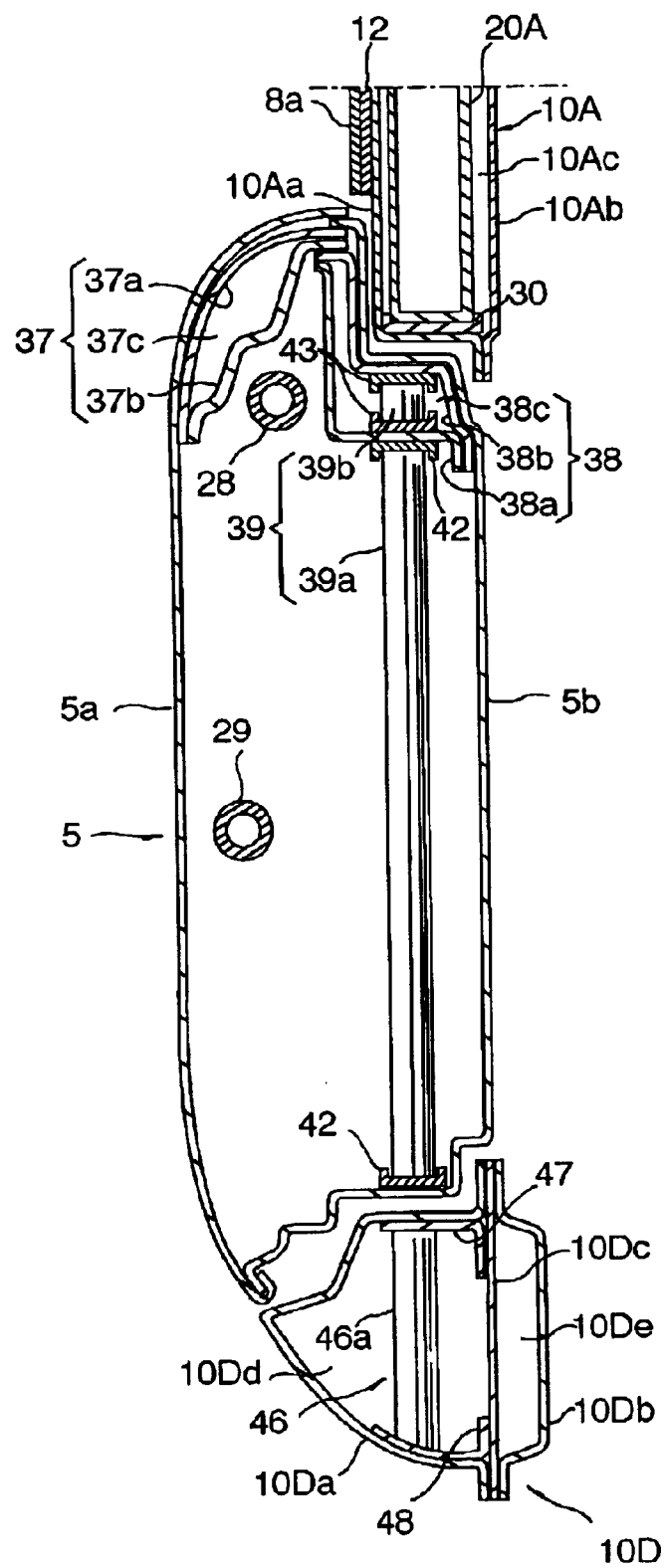
FIG. 16 is a cross-sectional view of a door with a body reinforcement.
Figure 17:
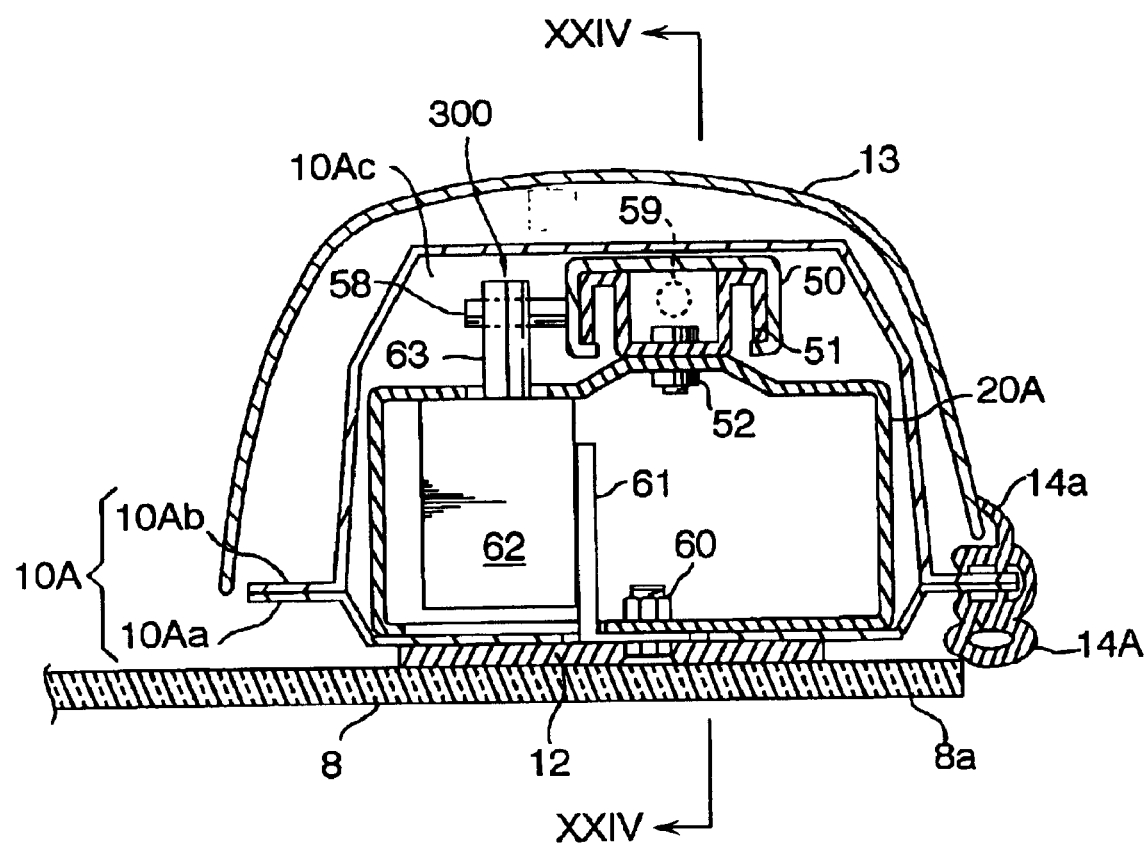
FIG. 17 is a cross-sectional view of a side body section of the convertible car according to still another embodiment of the present invention which is equipped with a pop-out type top-over protective structure.

FIG. 16 shows a variant of the door 5 forming a part of the side body structure of the car body 100 shown in FIGS. 3, 8 and 9. A door 5 has a door reinforcement 39 comprising two pieces of reinforcement bars 39a and 39b. As shown, the door 5 is provided with a door reinforcement bar 39a extending between and secured to the outer reinforcement member 38a of the door inner reinforcement 38 and the lower end of a door inner panel 5b through upper and lower retainers 42 and a door reinforcement bar 39b extending between and secured to the outer reinforcement member 38a an the inner reinforcement member 38b of the door inner reinforcement 38 through upper and lower retainers 43. Each of the door reinforcement bars 39a and 39b is made of a metal pipe. The door reinforcement bars 39a and 39b are in alignment with both of a windshield pillar reinforcement section 20A in a windshield pillar section 10A of a rigid frame 10 and a pair of side shill reinforcement bars 46 installed within a side shill section 10D of the frame 10.

The door 5 having the two piece door reinforcement bars 39a and 39b eliminates the use of an outer reinforcement member of the door inner reinforcement having an opening through which a door reinforcement bar 39 passes through like the door 5 shown in FIG. 9. Therefore, the door 5, in particular the upper part of the door 5, is prevented from a decrease in structural rigidity and, in consequence, bears an eternal load sufficiently upon an occurrence of a turnover of the car.

FIGS. 17 to 20 show a pop-out type tip-over protective structure incorporated in the windshield pillar section 10A of the rigid frame 10 of the car body 100 previously described. As shown, a windshield pillar section 10A of a rigid frame 10 is provided with a pop-out type tip-over protective structure 300 having a rigid guard strut 50 that pops out partly of the windshield pillar section 10A of the frame upon an occurrence of a turnover of the car.

Figure 18:
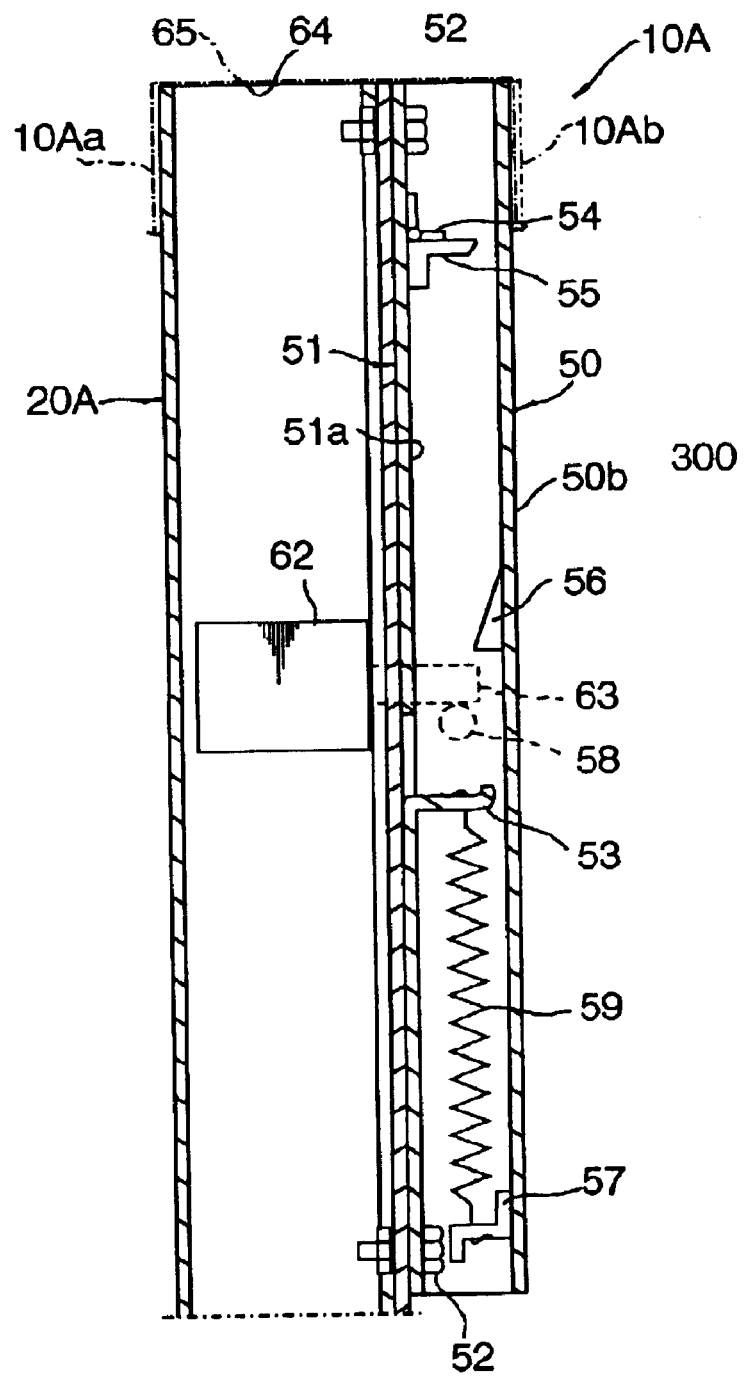
Figure 19:
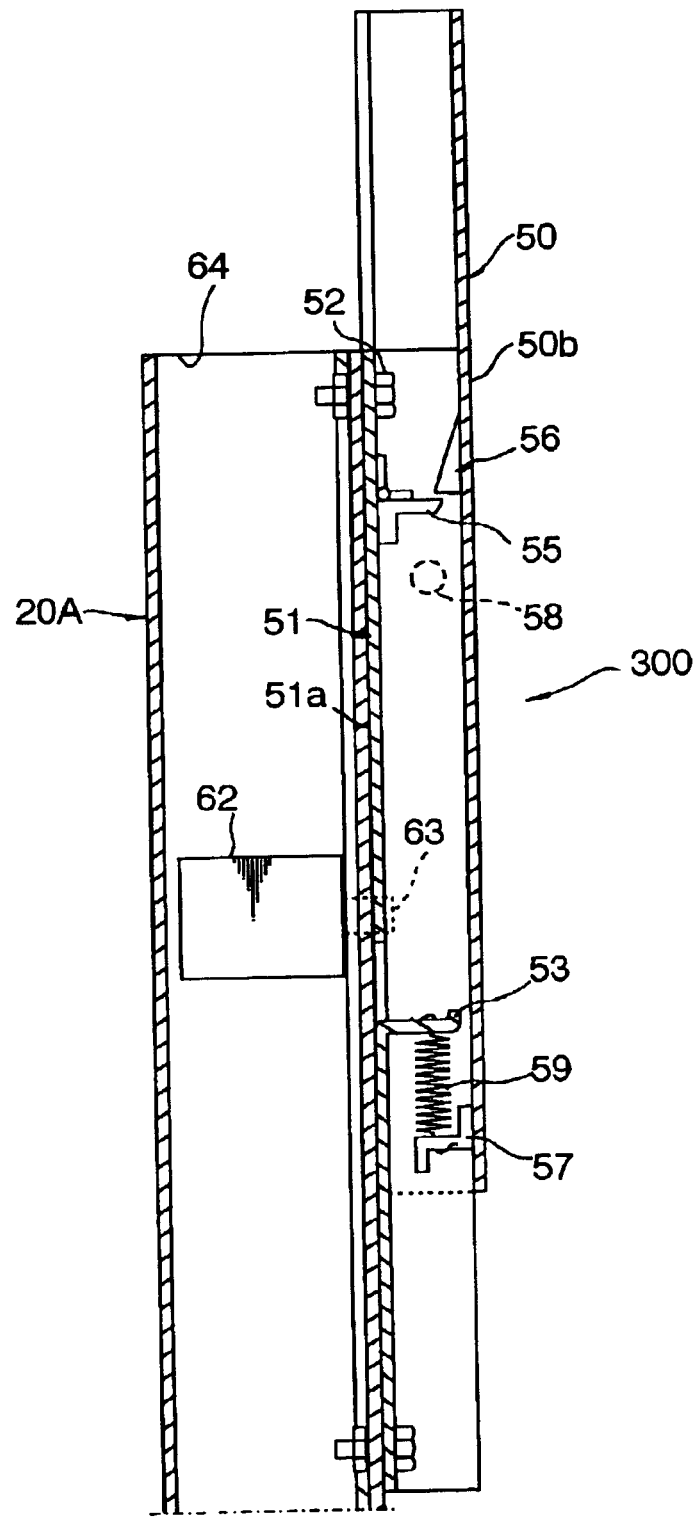
FIG. 19 is a cross-sectional view of the pop-out type tip-over protective structure in which the guard strut pops out.

Specifically, the windshield pillar section 10A of the frame 10 comprises a pillar outer panel 10Aa, a pillar inner panel 10Ab and a windshield pillar reinforcement section 20A. These pillar outer and inner panels 10Aa and 10Ab are welded, or otherwise secured, to each other so as to form a closed cross section 10Ac in which the windshield pillar reinforcement section 20A is disposed. There is provided with a generally U-shaped rigid guard strut 50 disposed within the windshield pillar section 10A. The guard strut 50 is usually in a normal or retained position within the windshield pillar section 10A as shown in FIG. 18 and pops out partly of the windshield pillar section 10A to a pop-out position beyond the top of the windshield 8 as shown in FIG. 19 upon an occurrence of a turnover of the car. The guard strut 50 is disposed on a generally U-shaped rigid guide rail 51 for slide up and down movement. The guide rail 51 is secured to the windshield pillar reinforcement section 20A adjacent to the pillar inner panel 10Ab by means of a plurality of fastening bolts and nuts 52.

Figure 20:
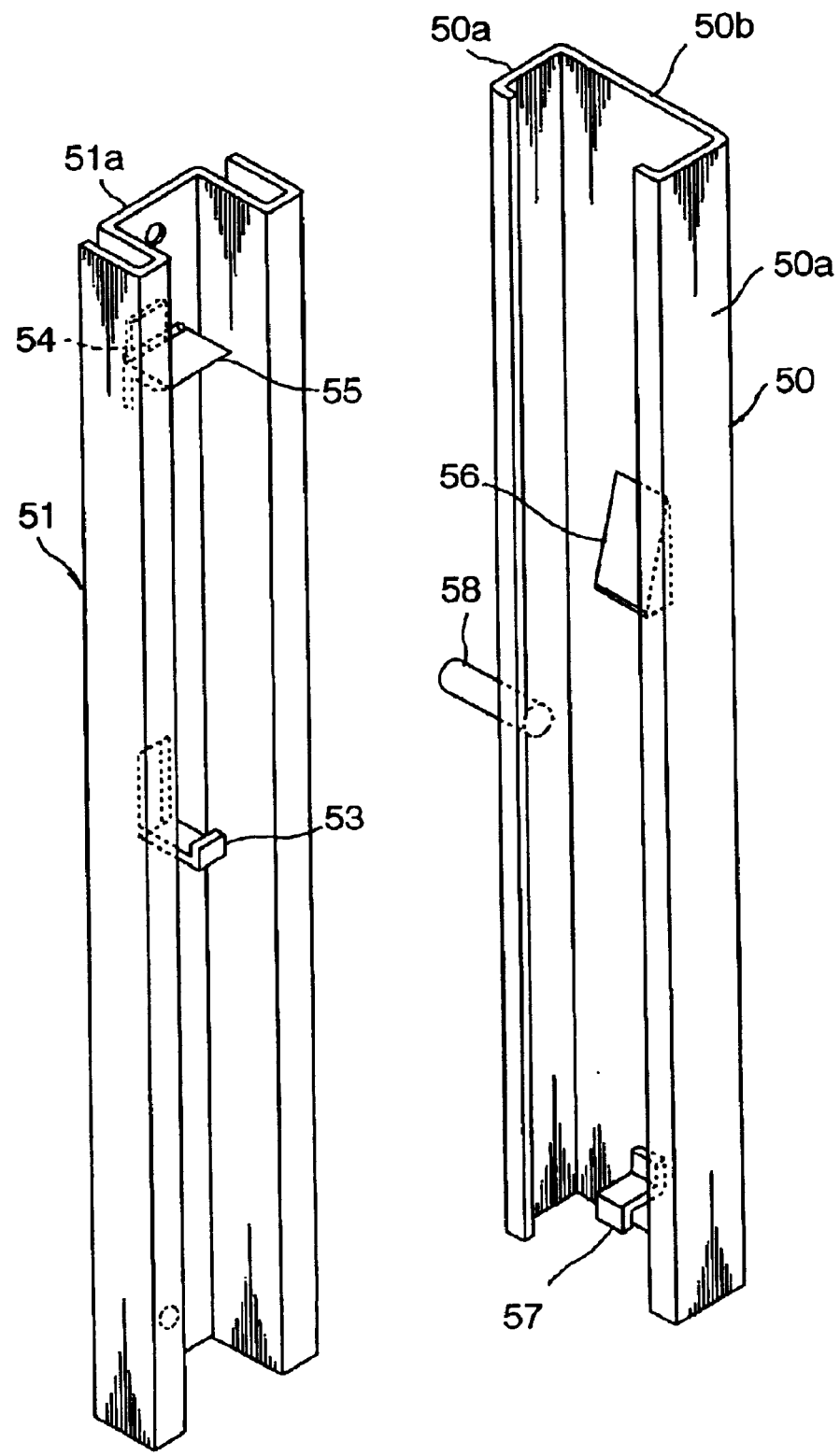
FIG. 20 is a exploded perspective view of the pop-out type tip-over protective structure.

As shown in detail in FIGS. 18 to 20, the guide rail 51 is formed with a retainer 53 cut out and raised from a bottom wall 51a at a middle location. On the other hand, the guard strut 50 is provided with a retainer 57 secured the bottom wall 50b at a lower location and a stopper pin 58 secured to one of opposite side walls 50a. A pop-out coil spring 59 is mounted between the retainer 53 of the guide rail 51 and the retainer 57 of the guard strut 50.

The pop-out type tip-over protective structure 300 has a strut lock mechanism 80A comprising a generally L-shaped stopper 55 pivotally mounted to the bottom wall 51a through a hinge joint 54 at an upper location and a wedge-shaped block 56 secured to the bottom wall 50b.

The windshield pillar section 10A is further provided with an actuator such as an electromagnetic solenoid 62 disposed within and secured to the upper vertical reinforcement section 11A of the body reinforcement 11 through a bracket 61 by means of bolt-and-nut fastening means 60. The electromagnetic solenoid 62 has a plunger 63 protrudes passing through an opening 11a formed in upper vertical reinforcement section 11A. The plunger 63 remains protruded to a retaining position where it engages the stopper pin 58 of the guard strut 50 while the actuator 62 is deenergized and retracts in so as thereby to release the stopper pin 58 of the guard strut 50. As seen in FIG. 18, the windshield pillar section 10A at its top end has an opening 64 for allowing the guard strut 50 to pop out partly of the windshield pillar section 10A. The opening 64 is closed by a top cover 65 such as a thin rubber cover and a thin cloth cover that is sufficiently weak to be broken or peeled off by the guard strut 50 popping out.

In the state where the guard strut 50 is in the retained position within the windshield pillar 10A where the stopper pin 58 is engaged by the plunger 63 of the electromagnetic solenoid 62 remaining deenergized, the pop-out coil spring 59 is expanded to charge thrust force. When the electromagnetic solenoid 62 is energized, it retracts the plunger 63 so as thereby to release the stopper pin 58 of the guard strut 50, and then, the guard strut 50 is immediately forced by the coil spring 59 to pop out partly of the windshield pillar 10A to the pop-out position. During pop-out movement of the guard strut 50, the wedge-shape block 56 pushes the top of the L-shaped stopper 55 at its sloped surface and pivotally turns the same. The L-shaped stopper 55 is returned to its original position by means of a spring (not shown) when the wedge-shaped block 56 passes over. After the guard strut 50 has popped out once, the strut lock mechanism 80A locks and prevents the guard strut 50 from retracting into the windshield pillar 10A by means of engagement between the L-shaped stopper 55 of the guide rail 51 and the wedge-shaped block 56 of the guard strut 50 even while the guard strut 50 is applied with an external load. The electromagnetic plunger 62 is accompanied by an actuator circuit 200 for energizing the electromagnetic solenoid 62 upon an occurrence of a turnover of the car of the car.

Figure 21:
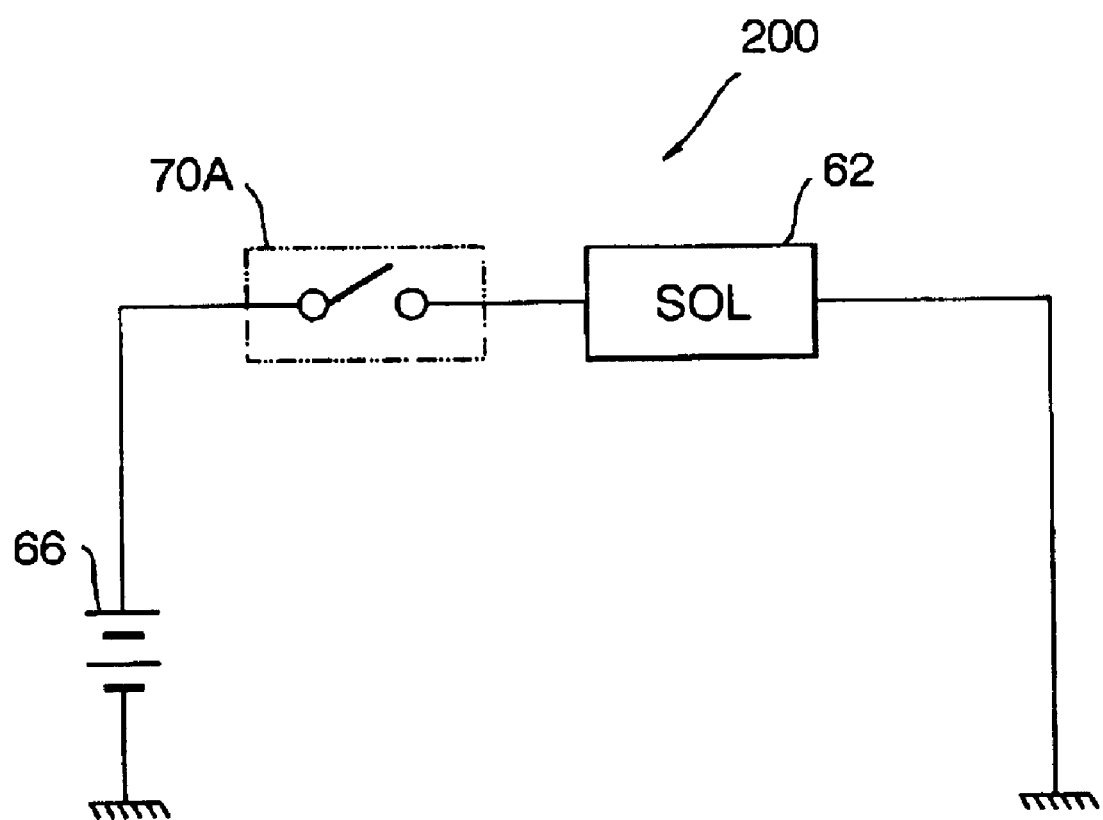
FIG. 21 is a circuit diagram of an actuator of the pop-out type tip-over protective structure.

As shown in FIG. 21, the actuator circuit 200 comprises a battery 66 and an actuator such as a gravity sensitive switch 70A connected in series to the electromagnetic solenoid 62. The gravity sensitive switch 70A operates to turn on to energize the electromagnetic solenoid 62 when it receives a predetermined gravity upon an occurrence of a turnover of the car. The gravity sensitive switch 70A is known in various forms in the art and may take any form well known to those skilled in the automobile field.

Figure 22:
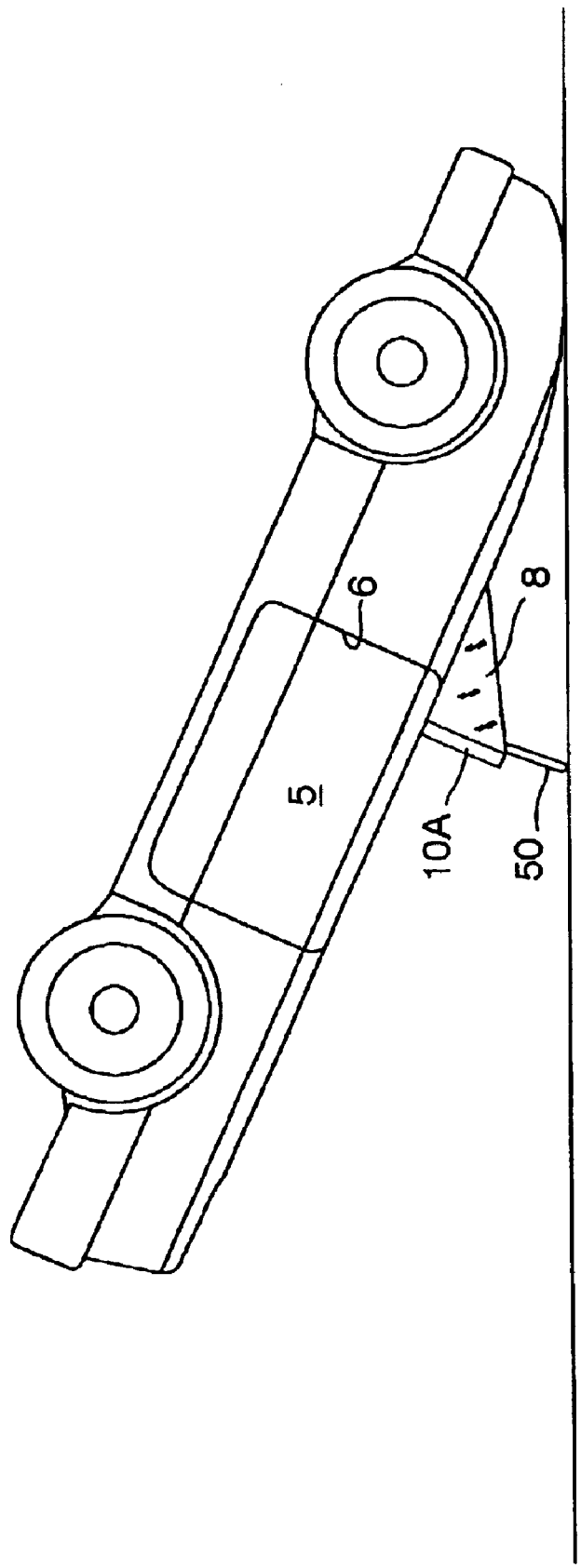
FIG. 22 is a view of the convertible car in an event of a turnover.

When the car overturns, the gravity sensitive switch 70A turns on in response to an impact load greater than the predetermined gravity, the electromagnet solenoid 62 retracts the plunger 63, so that the guard strut 50 immediately pops out partly of the windshield pillar 10A breaking the top cover 65. As a result, if the car turns upside down as shown in FIG. 22, the guard strut 50 bears the weight of the car body 100 sufficiently to protect the occupants safely.

The pop-out type tip-over protective structure can be installed in the windshield pillar section 10A of the frame 10 with neither accompanying a decrease in structural rigidity of the car body 100 nor changing an attractive outer appearance of the windshield pillar section 10A.

Figure 23:
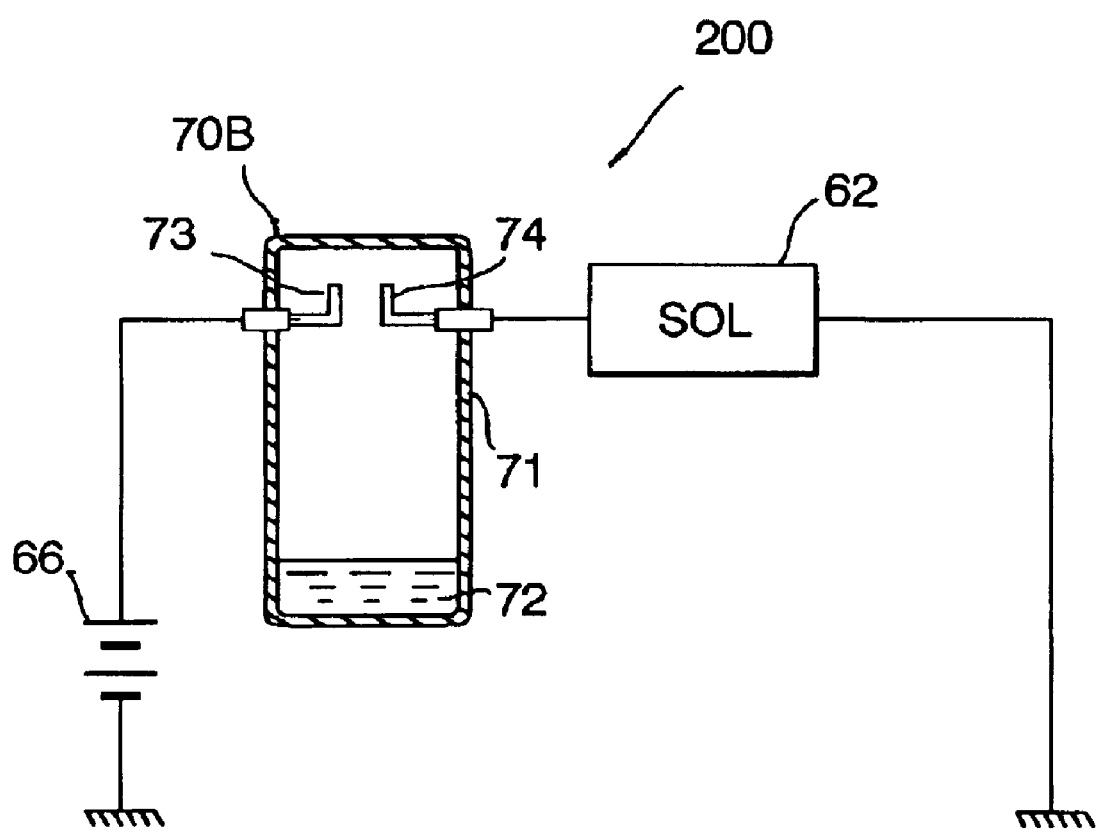
FIG. 23 is a circuit diagram of a variant of the actuator of the pop-out type tip-over protective structure.

FIG. 23 shows a variant of the actuator circuit 200 for energizing an electromagnetic solenoid of the pop-out type tip-over protective structure upon an occurrence of a turnover of the car.

As shown, an actuator circuit 200 has a mercury switch 70B connected in series between a battery 66 and an electromagnetic solenoid 62 of the pop-out type tip-over protective structure. The mercury switch 70B, that is known in various forms in the art and may take any form well known to those skilled in the automobile field, comprises, for example, a sealed vessel 71 with a predetermined amount of fluid and electrically conductive mercury 72 contained therein and a pair of electric contacts 73 and 74 connected to the battery 66 and the electromagnetic solenoid 62, respectively, that are positioned in close proximity to each other. The amount of mercury in the sealed vessel 71 is such that the mercury 72 does not flow to the electric contacts 73 and 74 in the events of a frontal collision, a side collision and a rear end collision but flow into between the electric contacts 73 and 74 in the event of a turnover.

When an eternal impact load is applied to the mercury switch 70B upon an occurrence of a turnover of the car of the car, the mercury 72 flows into between the electric contacts 73 and 74 so as thereby to pass an electric current between them. As a result, the electromagnetic solenoid 62 is energized to protrude its plunger.

Figure 24:
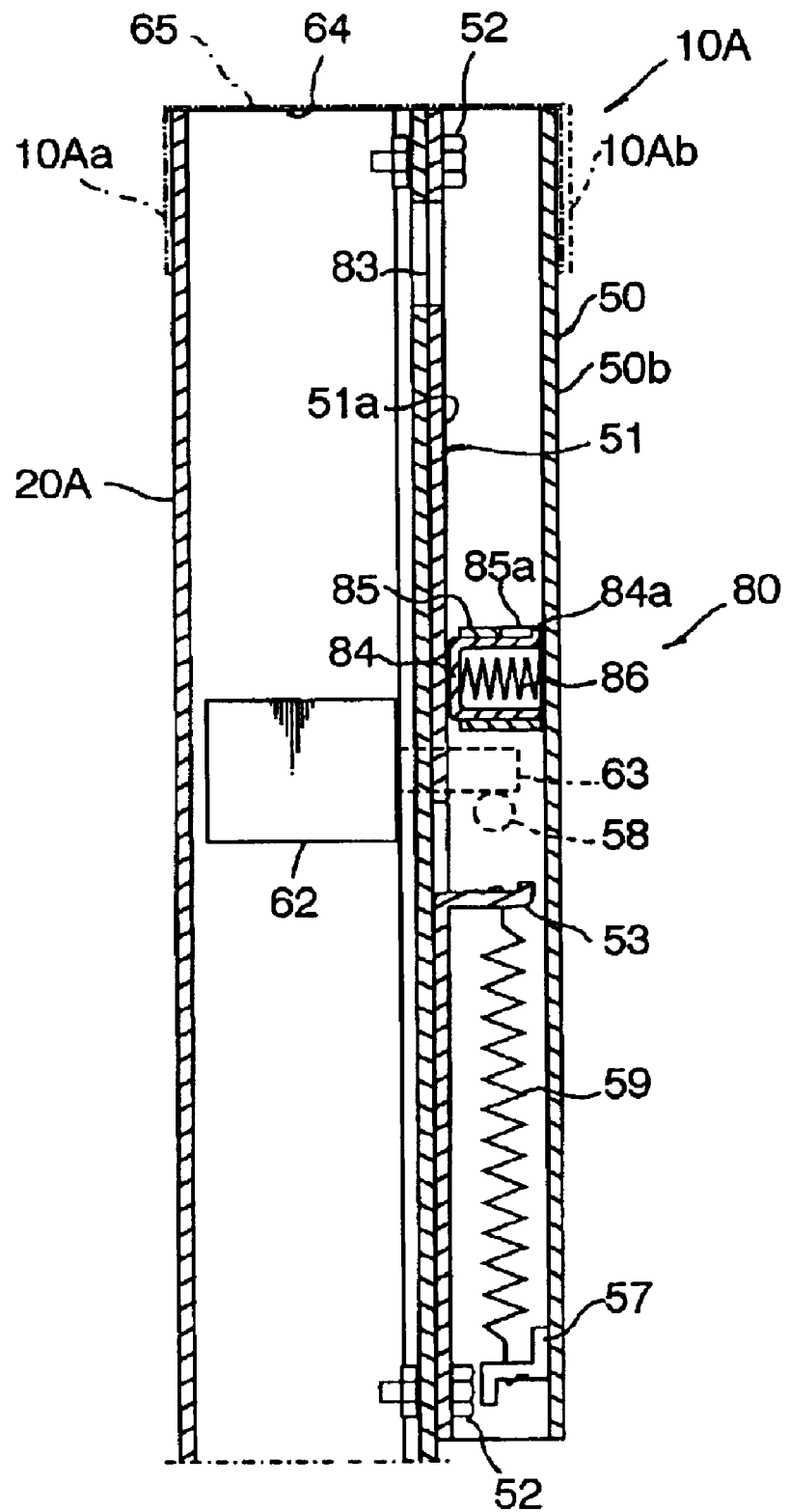
Figure 25:
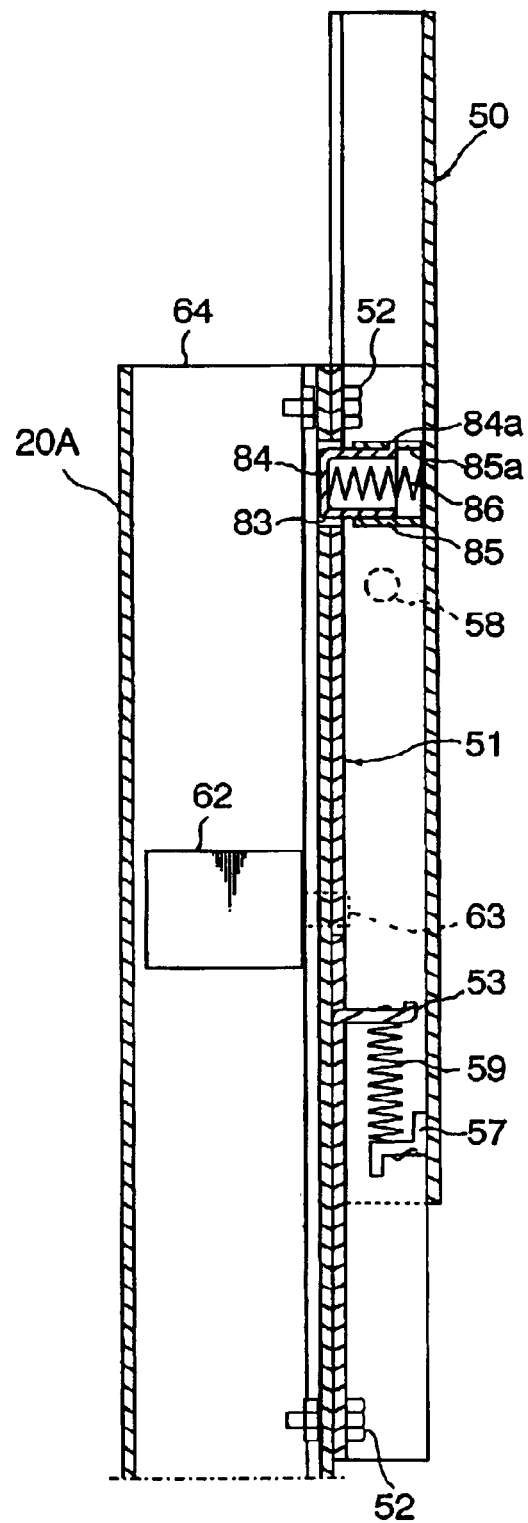
FIG. 25 is a cross-sectional view of the pop-out type tip-over protective structure in which the guard strut pops out.

FIGS. 24 and 25 show a variant of the strut lock mechanism 80A of the pop-out type tip-over protective structure 300 shown in FIGS. 17 to 20. As shown, a strut lock mechanism 80B comprises a guide cylinder 85 secured to a bottom wall 50b of a generally U-shaped rigid guard strut 50, a cylindrical lock slider 84 received in the guide cylinder 85 and a lock hole 83 formed in a bottom wall 51a of a guide rail 51. A spring 86 is disposed between the guide cylinder 85 and the lock slider 84 so as to force the lock slider 85 in an axial direction. The lock slider 84 is formed with a partial flange 84a. On the other hand, the guide cylinder 85 is formed with an axial guide slot 85a for guiding axial movement of the lock slider 84. While the guard strut 50 is in its normal or retained position shown in FIG. 24, the lock slider 84 is pushed in the guide cylinder 85 against the spring 86. When the guard strut 50 pops out partly of the guide rail 51 to its pop-out position shown in FIG. 25, the lock slider 84 is forced to protrude from the guide cylinder 85 by the spring 86 and enters the lock hole 83, so as thereby to lock the guard strut 51 in the pot-out position. In this instance, the spring 86 has a spring constant sufficiently smaller than that of the spring 59 so as to have no adverse effect on pop-out movement of the guard strut 50.

The present invention has been described with reference to preferred embodiments thereof. However, it will be appreciated that variants and other embodiments can be effected by person of ordinary skill in the art without departing from the scope of the invention.

What is claimed is:

1. A car body structure for cars having a folding roof and a single front window opening closed up by a single transparent windshield, said side body structure comprises:

a side body section having a door opening;

a door opening and closing said door opening; and a windshield pillar extending almost vertically from said side body section and positioned behind both said front window opening and a front end of said door opening in a lengthwise direction of said car and above an upper edge of said door so as to extend said transparent windshield close to an occupant of said car and to support each of opposite sides of said transparent windshield, said windshield pillar being provided with a windshield pillar reinforcement therealong;

wherein said transparent windshield is secured to said windshield pillar at an outer side in a transverse direction from one side to another side of the car body.

2. A car body structure as defined in claim 1, wherein said windshield pillar is formed so as to have a closed cross section and said windshield pillar reinforcement is provided within said closed cross section of said windshield pillar.

3. A car body structure as defined in claim 1, wherein said windshield pillar reinforcement comprises a hydroformed pipe.

4. A car body structure as defined in claim 1, wherein said windshield pillar reinforcement comprises a solid foam filled within said windshield pillar.

5. A car body structure as defined in claim 1, wherein said car body has a folding roof.

6. A car body structure as defined in claim 1, and further comprising at least one of side body reinforcements incorporated in rigid structures, respectively, that form parts of said side body section of said car body.

7. A car body structure as defined in claim 6, wherein said side body reinforcement is incorporated in a rigid structural member that continuously extends from said windshield pillar as one integral piece.

8. A car body structure as defined in claim 1, wherein said rigid structural member comprises outer and inner panel members secured to each other so as to form a closed cross section within which said side body reinforcement is disposed.

9. A car body structure as defined in claim 1, wherein said side body reinforcement is installed in and connected to said door so as to be in alignment with said windshield pillar in a vertical direction while said door closes said door opening.

10. A car body structure as defined in claim 9, wherein said windshield pillar at its top end is closed by a top cover.

11. A car body structure for cars having a folding roof and a single front window opening closed up by a single transparent windshield, said side body structure comprises:

side body section having a door opening;

a door opening and closing said door opening; and a windshield pillar extending almost vertically from said side body section and positioned behind both said front window opening and a front end of said door opening in a lengthwise direction of said car and above an upper edge of said door so as to extend said transparent windshield close to an occupant of said car and to support each of opposite sides of said transparent windshield, said windshield pillar being provided with a windshield pillar reinforcement therealong;

wherein said side body reinforcement is incorporated in a rigid structural member that continuously extends from said windshield pillar as one integral piece and connected to said windshield pillar reinforcement through a reinforcement extending in said lengthwise direction.

12. A car body structure as defined in claim 11, wherein said rigid structural member comprises outer and inner panel members secured to each other so as to form a closed cross section within which said side body reinforcement is disposed.

13. A car body structure as defined in claim 11, wherein said side body reinforcement is installed in and connected to said door so as to be in alignment with said windshield pillar in a vertical direction while said door closes said door opening.

14. A car body structure as defined in claim 13, wherein said windshield pillar at its top end is closed by a top cover.

15. A car body structure as defined in claim 11, wherein said windshield pillar is formed so as to have a closed cross section and said windshield pillar reinforcement is provided within said closed cross section of said windshield pillar.

16. A car body structure as defined in claim 11, wherein said windshield pillar reinforcement comprises a hydroformed pipe.

17. A car body structure as defined in claim 11, wherein said windshield pillar reinforcement comprises a solid foam filled within said windshield pillar.

18. A car body structure as defined in claim 11, wherein said car body has a folding roof.

19. A car body structure as defined in claim 11, further comprising at least one of side body reinforcements incorporated in rigid structures, respectively, that form parts of said side body section of said car body.

20. A car body structure as defined in claim 19, wherein said side body reinforcement is incorporated in a rigid structural member that continuously extends from said windshield pillar as one integral piece.

21. A car body structure for cars having a folding roof and a single front window opening closed up by a single transparent windshield, said side body structure comprises:

a side body section having a door opening;

a door opening and closing said door opening; and a windshield pillar extending almost vertically from said side body section and positioned behind both said front window opening and a front end of said door opening in a lengthwise direction of said car and above an upper edge of said door so as to extend said transparent windshield close to an occupant of said car and to support each of opposite sides of said transparent windshield, said windshield pillar being provided with a windshield pillar reinforcement therealong;

at least one of side body reinforcements, each side body reinforcement being incorporated in a rigid structural member that continuously extend from said windshield pillar as one integral piece, that form parts of said side body section of said car body; and a pop-out type tip-over protective structure comprising:

turnover detection means for detecting a turnover of said car body;

a guard strut received for slide movement in said windshield pillar, said guard strut being forced to pop out partly of said windshield pillar when said turnover detection means detects a turnover of said car body so as thereby to bear weight of said car body overturned; and lock means for locking said guard strut popped out.

22. A car body structure as defined in claim 21, wherein said windshield pillar is formed so as to have a closed cross section and said windshield pillar reinforcement is provided within said closed cross section of said windshield pillar.

23. A car body structure as defined in claim 21, wherein said windshield pillar reinforcement comprises a hydroformed pipe.

24. A car body structure as defined in claim 21, wherein said windshield pillar reinforcement comprises a solid foam filled within said windshield pillar.

25. A car body structure as defined in claim 21, wherein said car body has a folding roof.

26. A car body structure as defined in claim 21, and further comprising at least one of side body reinforcements incorporated in rigid structures, respectively, that form parts of said side body section of said car body.

27. A car body structure as defined in claim 26, wherein said side body reinforcement is incorporated in a rigid structural member that continuously extends from said windshield pillar as one integral piece.

28. A car body structure as defined in claim 21, wherein said rigid structural member comprises outer and inner panel members secured to each other so as to form a closed cross section within which said side body reinforcement is disposed.

29. A car body structure as defined in claim 21, wherein said side body reinforcement is installed in and connected to said door so as to be in alignment with said windshield pillar in a vertical direction while said door closes said door opening.

30. A car body structure as defined in claim 29, wherein said windshield pillar at its top end is closed by a top cover.

* * * * *